(12) United States Patent
Glover et al.

(10) Patent No.: US 10,157,210 B2
(45) Date of Patent: Dec. 18, 2018

(54) SEARCHING AND ACCESSING SOFTWARE APPLICATION FUNCTIONALITY USING APPLICATION CONNECTIONS

(71) Applicant: Samsung Electronics Co., Ltd., Suwon-si, Gyeonggi-do (KR)

(72) Inventors: Eric Glover, Palo Alto, CA (US); Gilead Mark, Palo Alto, CA (US); Manikandan Sankaranarasimhan, Fremont, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 390 days.

(21) Appl. No.: 14/967,186

(22) Filed: Dec. 11, 2015

(65) Prior Publication Data

US 2017/0169024 A1  Jun. 15, 2017

(51) Int. Cl.
  *G06F 17/00*  (2006.01)
  *G06F 17/30*  (2006.01)
  *G06N 99/00*  (2010.01)

(52) U.S. Cl.
  CPC .... *G06F 17/3053* (2013.01); *G06F 17/30867* (2013.01); *G06F 17/30964* (2013.01); *G06N 99/005* (2013.01)

(58) Field of Classification Search
  CPC .......... G06F 17/3053; G06F 17/30554; G06F 3/013; G06F 3/0482; G06F 3/04842; G06F 17/30241
  See application file for complete search history.

(56) References Cited

U.S. PATENT DOCUMENTS

2016/0162555 A1*  6/2016  Shapira ............. G06F 17/30554
                                          707/722

* cited by examiner

*Primary Examiner* — Truong V Vo
(74) *Attorney, Agent, or Firm* — Jefferson IP Law, LLP

(57) ABSTRACT

Techniques include, for an application (app) state record including an app access mechanism (AAM) that references a native app and indicates operations for it to perform and app state information (ASI) that describes a state of the app after it performs the operations, determining connections (e.g., links with other resources) associated with the app and generating a quality value indicating quality of the app based on the connections. The techniques further include identifying the record based on a search query and the quality value (e.g., using the value as a boost factor within Lucene® information retrieval software). Additionally, or alternatively, the techniques include generating a result score for the record based on the quality value and selecting the record from among other records based on the score. The techniques also include selecting the AAM from the record and transmitting the AAM to the user device as a search result.

20 Claims, 14 Drawing Sheets

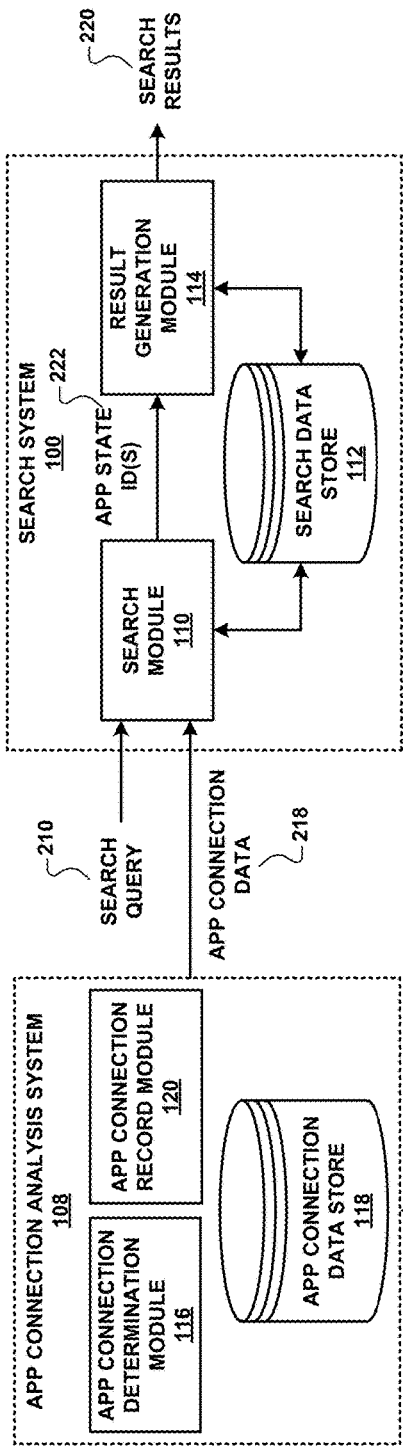
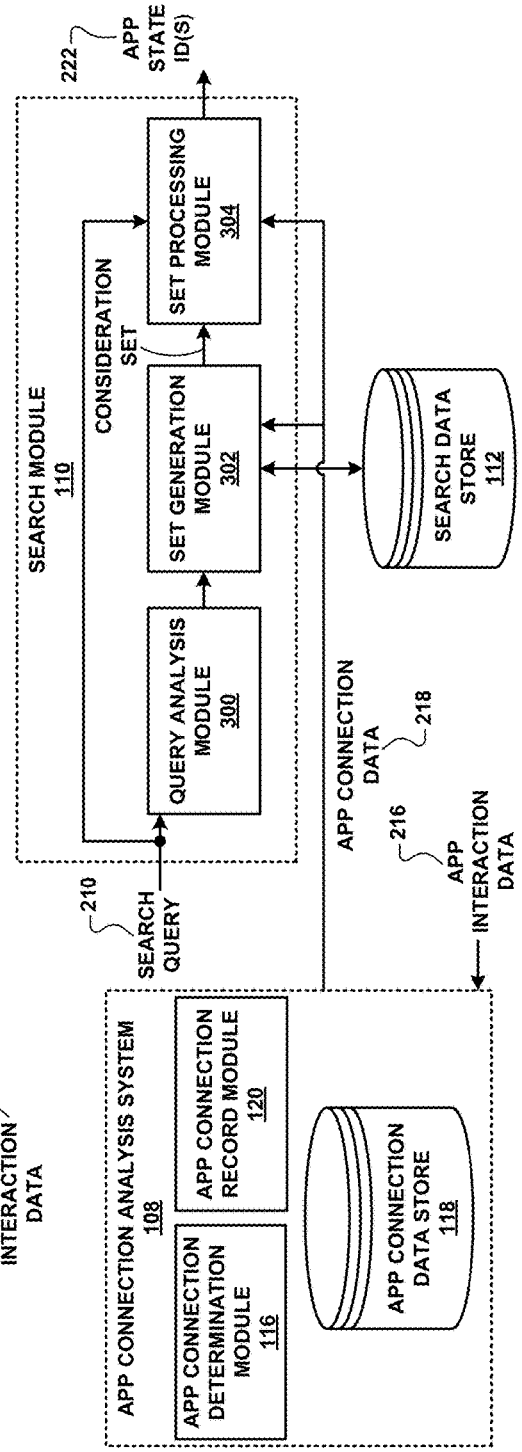
FIG. 3A
FIG. 3B

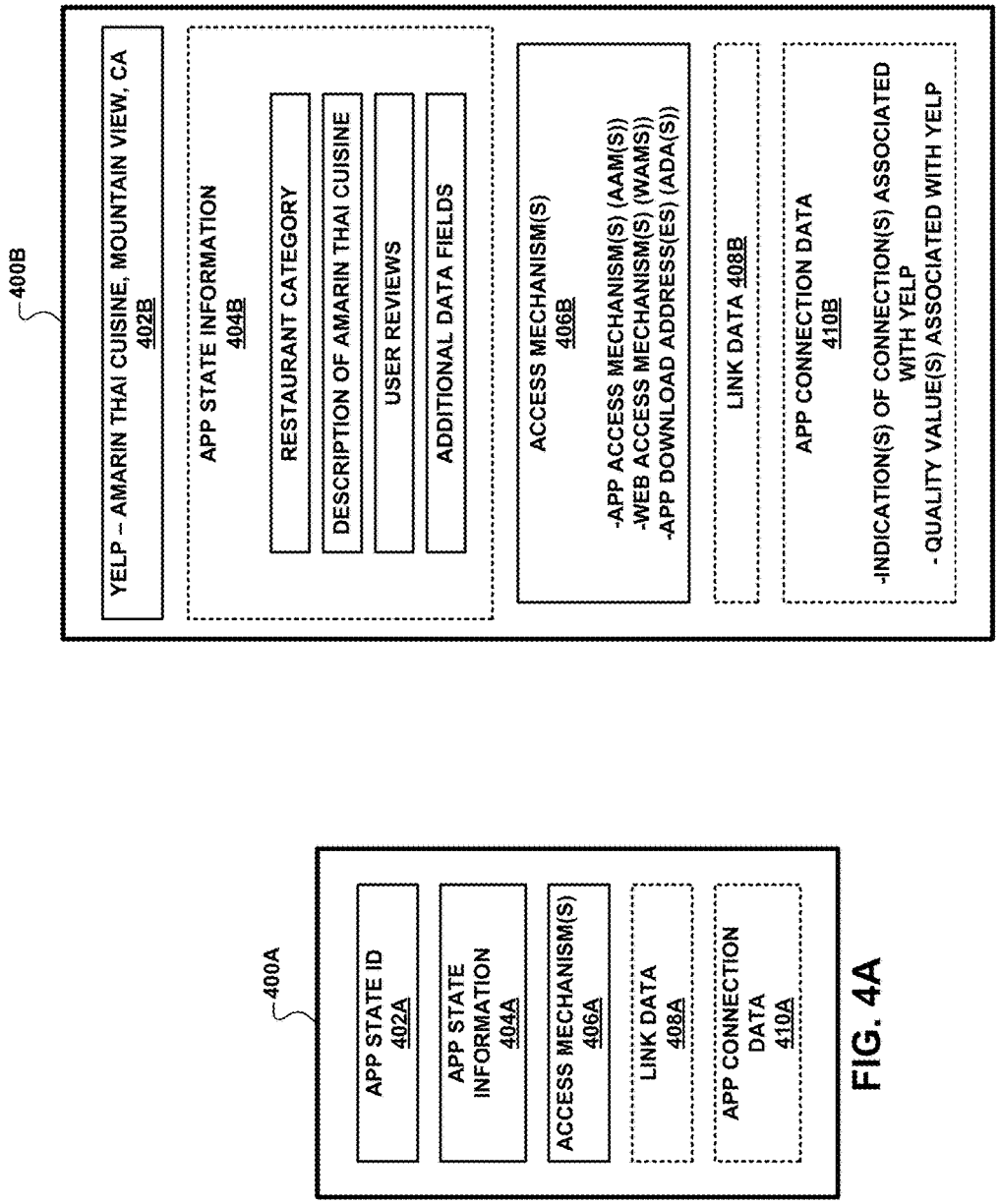

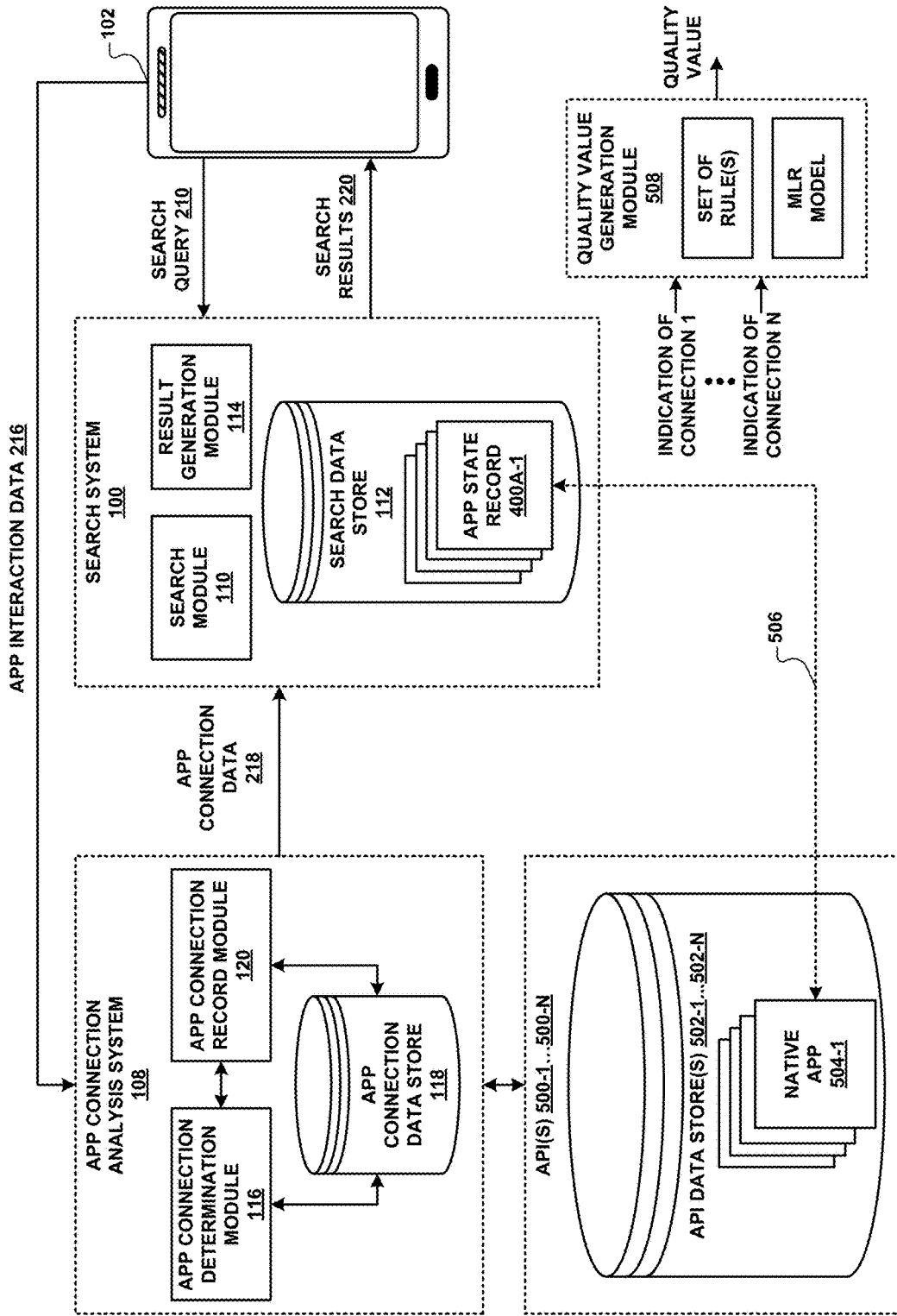

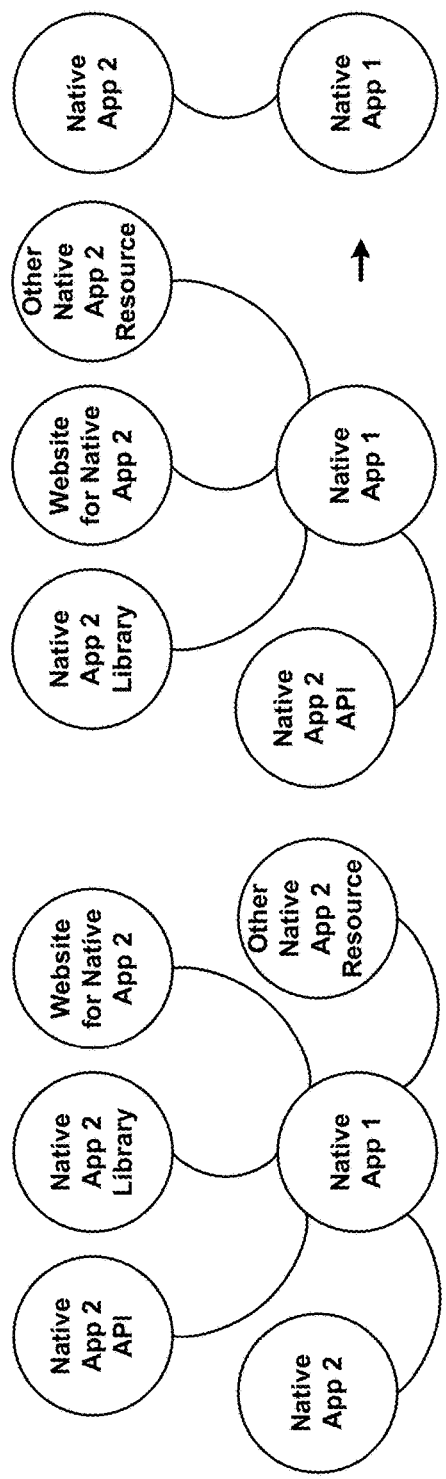
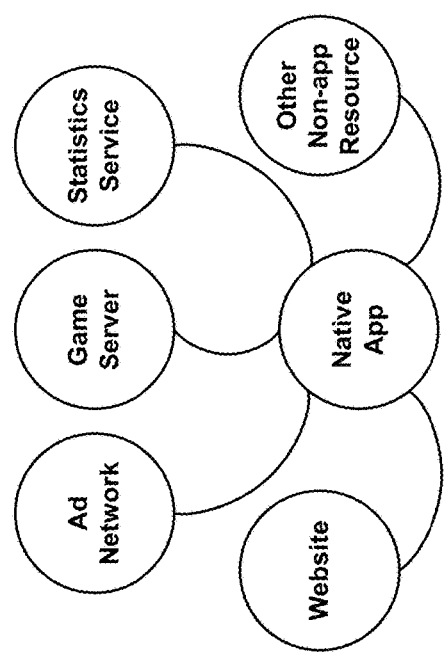
FIG. 6A
FIG. 6B
FIG. 6C

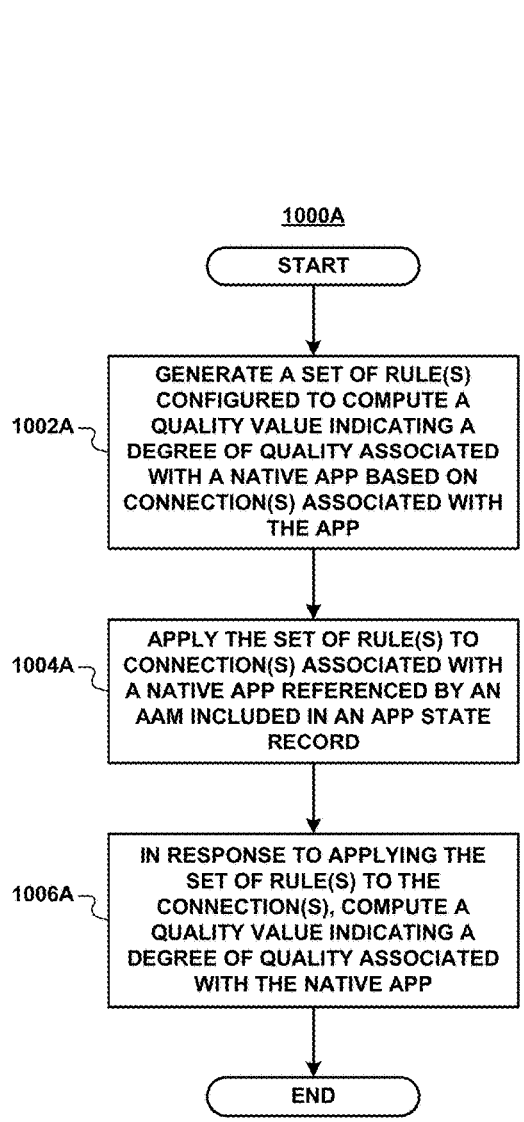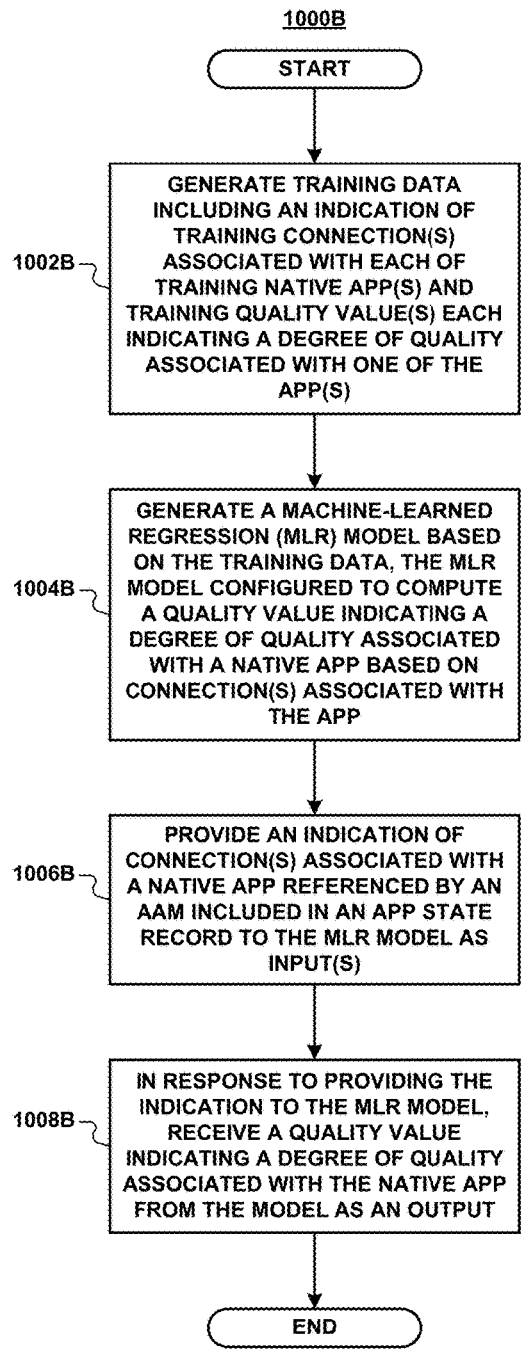
FIG. 10A
FIG. 10B

SEARCHING AND ACCESSING SOFTWARE APPLICATION FUNCTIONALITY USING APPLICATION CONNECTIONS

TECHNICAL FIELD

This disclosure generally relates to the field of search, and more particularly to techniques for generating search results that correspond to states of software applications (apps).

BACKGROUND

In recent years, the use of computers, smartphones, and other Internet-connected computing devices has grown significantly. Correspondingly, the number of software applications (apps) available for such computing devices has also grown. Today, many diverse software apps can be accessed on a number of different computing devices, including smartphones, personal computers, automobiles, and televisions. These software apps may include business driven apps, games, educational apps, news apps, shopping apps, messaging apps, media streaming apps, and social networking apps. Because of the large number of software apps available today and the wide range of functionality they provide, computing device users often require the ability to search for and access specific software app functionality.

SUMMARY

In one example, a method includes, for each of a plurality of application (app) state records each including an app access mechanism (AAM) that references a native app and indicates one or more operations for the app to perform and app state information (ASI) that describes a state of the app after the app performs the operations, determining one or more connections associated with the app and generating a quality value indicating a degree of quality associated with the app based on the connections. The method further includes receiving a search query from a user device and identifying one or more of the plurality of app state records based on the query and the quality value associated with each identified record. The method also includes selecting the one or more AAMs from the identified app state records and transmitting the AAMs to the user device.

In another example, a method includes, for each of a plurality of app state records each including an AAM that references a native app and indicates one or more operations for the app to perform and ASI that describes a state of the app after the app performs the operations, determining one or more connections associated with the app and generating a quality value indicating a degree of quality associated with the app based on the connections. The method further includes receiving a search query from a user device and identifying one or more of the plurality of app state records based on the query. The method still further includes, for each of the identified app state records, generating a result score based on the quality value associated with the record. The method also includes selecting one or more of the identified app state records based on the result score associated with each selected record, selecting the one or more AAMs from the selected records, and transmitting the AAMs to the user device.

In another example, a system includes one or more computing devices configured to, for each of a plurality of app state records each including an AAM that references a native app and indicates one or more operations for the app to perform and ASI that describes a state of the app after the app performs the operations, determine one or more connections associated with the app and generate a quality value indicating a degree of quality associated with the app based on the connections. The devices are further configured to receive a search query from a user device and identify one or more of the plurality of app state records based on the query and the quality value associated with each identified record. The devices are also configured to select the one or more AAMs from the identified app state records and transmit the AAMs to the user device.

In another example, a system includes one or more computing devices configured to, for each of a plurality of app state records each including an AAM that references a native app and indicates one or more operations for the app to perform and ASI that describes a state of the app after the app performs the operations, determine one or more connections associated with the app and generate a quality value indicating a degree of quality associated with the app based on the connections. The devices are further configured to receive a search query from a user device and identify one or more of the plurality of app state records based on the query. The devices are still further configured to, for each of the identified app state records, generate a result score based on the quality value associated with the record. The devices are also configured to select one or more of the identified app state records based on the result score associated with each selected record, select the one or more AAMs from the selected records, and transmit the AAMs to the user device.

In another example, a non-transitory computer-readable storage medium includes instructions that cause one or more computing devices to, for each of a plurality of app state records each including an AAM that references a native app and indicates one or more operations for the app to perform and ASI that describes a state of the app after the app performs the operations, determine one or more connections associated with the app and generate a quality value indicating a degree of quality associated with the app based on the connections. The instructions further cause the devices to receive a search query from a user device and identify one or more of the plurality of app state records based on the query and the quality value associated with each identified record. The instructions also cause the devices to select the one or more AAMs from the identified app state records and transmit the AAMs to the user device.

In another example, a non-transitory computer-readable storage medium includes instructions that cause one or more computing devices to, for each of a plurality of app state records each including an AAM that references a native app and indicates one or more operations for the app to perform and ASI that describes a state of the app after the app performs the operations, determine one or more connections associated with the app and generate a quality value indicating a degree of quality associated with the app based on the connections. The instructions further cause the devices to receive a search query from a user device and identify one or more of the plurality of app state records based on the query. The instructions still further cause the devices to, for each of the identified app state records, generate a result score based on the quality value associated with the record. The instructions also cause the devices to select one or more of the identified app state records based on the result score associated with each selected record, select the one or more AAMs from the selected records, and transmit the AAMs to the user device.

BRIEF DESCRIPTION OF DRAWINGS

The details of one or more examples are set forth in the accompanying drawings and the description below. Other features, objects, and advantages will be apparent from the description and drawings, and from the claims.

FIG. 3A is a functional block diagram of an example search system.

FIG. 3B is a functional block diagram of an example search module.

FIGS. 4A-4B illustrate example app state records.

FIG. 5A illustrates another example user device in communication with an example search system and an example app connection analysis system.

FIG. 5B illustrates an example quality value generation module.

FIGS. 6A-6D are conceptual diagrams of example connections associated with native apps and an example app connection graph.

FIGS. 8-10B are flow diagrams that illustrate example methods for generating search results based on a search query and app connection data using a search system.

DETAILED DESCRIPTION

Figure 1:
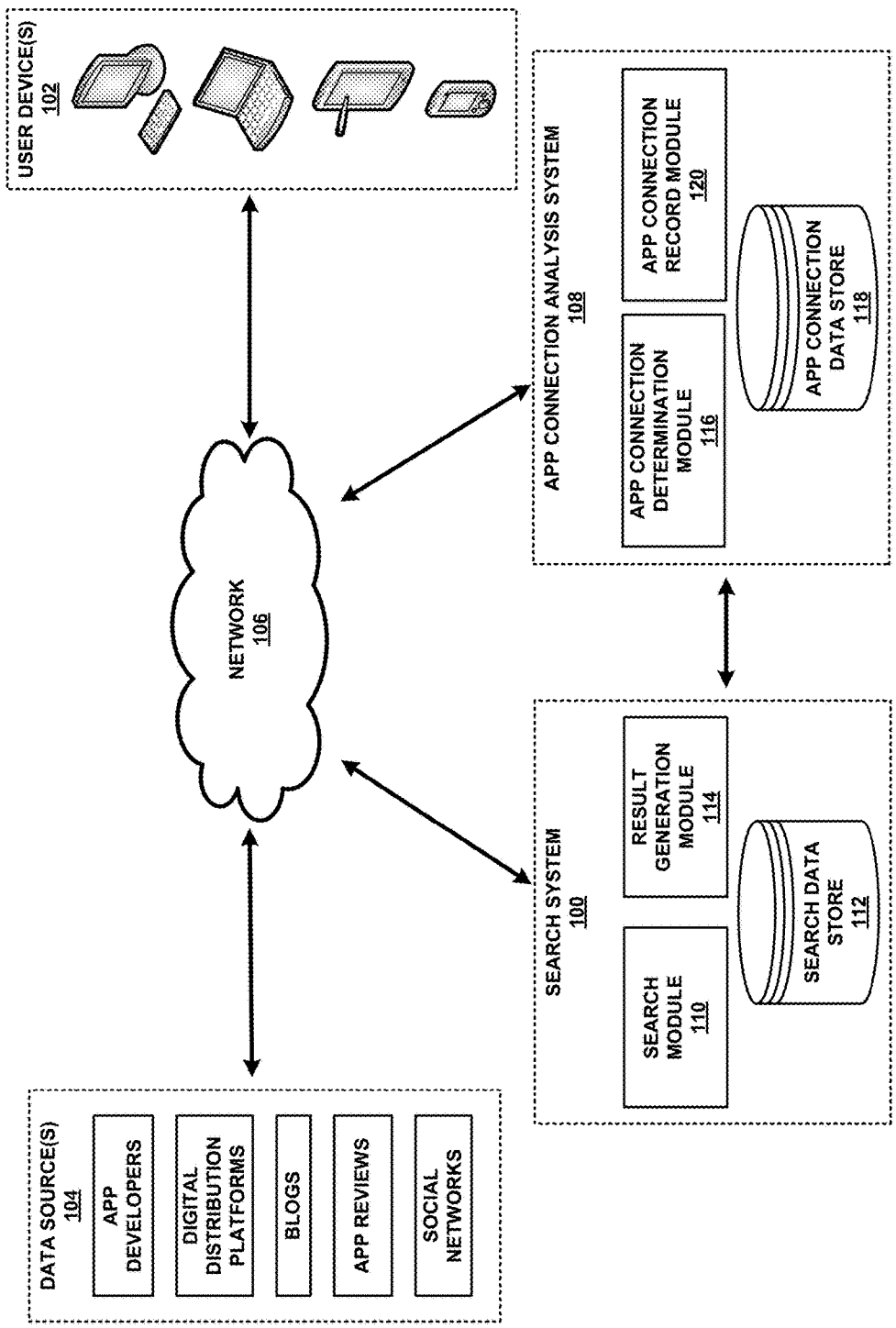
FIG. 1 illustrates an example environment that includes a search system, an application (app) connection analysis system, one or more data sources, and one or more user devices that communicate via a network.

The figures and the following description relate to example implementations by way of illustration only. It should be noted that from the following discussion, alternative implementations of the structures and methods disclosed herein will be readily recognized as viable alternatives that may be employed without departing from the scope of this disclosure.

The present disclosure generally relates to the field of search, and, more particularly, to techniques for generating and displaying search results that specify states of software applications (apps) based on connections (e.g., links to and from various resources) associated with the apps. In general, the techniques include initially identifying one or more connections (e.g. links) associated with each of one or more software apps. The techniques further include, for each of the software apps, generating a value of a quality metric (e.g., a "quality value") that indicates a degree of quality associated with the app based at least in part on the connections identified for the app. The techniques also include, in response to receiving a search query from a user device, generating search results that specify one or more states of one or more of the software apps based on the query and the quality value associated with each app. Using the techniques described herein may improve search result relevance and enhance user experience.

According to the disclosed techniques, a user of a user device (e.g., a mobile computing device) may input a search query (e.g., a text string) into a search field of a search app executing on the device. The user may then cause the user device (e.g., the search app) to transmit the search query to a search system. The search system may receive the search query from the user device, generate search results that each specify a state of a software app using the query, and transmit the results to the device. To generate the search results, the search system may initially generate app connection data for software apps the states of which are specified by app state records included in the system. In particular, the search system may, for each app state record, determine one or more connections associated with the software app the state of which is specified by the record. The search system may further generate a quality value indicating a degree of quality associated with the software app based at least in part on the determined connections and associate the value with (e.g., the state of the app specified by) the app state record. The search system may then identify one or more of the app state records included in the system based on the search query received from the user device and based on the quality value associated with each identified record. For example, the search system may identify each app state record by using the quality value associated with the record as a so-called "boost factor" within Lucene® information retrieval software developed by the Apache Software Foundation (hereinafter, "Lucene"), or as a similar input within other information retrieval software. Alternatively, the search system may identify one or more of the app state records included in the system based on the search query, in a similar manner as described above. In this example, the search system may further rank (e.g., arrange in an order) the identified app state records based on the quality values associated with the records and select one or more (e.g., highest-ranking ones) of the ranked records for further consideration.

The search system may generate the search results using the app state records identified and/or ranked based on the quality values associated with the records. Specifically, the search system may select one or more access mechanisms (AMs) from the app state records and generate the search results to include the AMs and, e.g., other data associated with the records. The search system may then transmit the search results, including the AMs and, e.g., the other data, to the user device. The user device may receive the search results from the search system and display the results to the user (e.g., as one or more user selectable links). In some examples, the user device may use the other data received from the search system with the search results to display the results to the user (e.g., to generate and/or arrange the user selectable links).

The user may select one or more of the search results (e.g., one or more of the associated user selectable links) on the user device. Upon the user selecting a particular search result (e.g., an associated user selectable link), the user device may launch the corresponding software app and set the app into a state specified by the selected result (e.g., by the selected user selectable link). The user may then interact with the state on the user device (e.g., preview and/or perform a function provided by the state). In other examples, upon the user selecting the search result, the user device may download and install the software app. After installing the software app, the user device may launch the app and set the app into the state specified by the selected result, in a similar manner as described above. In still other examples, upon the user selecting the search result, the user device may launch a web browser app and access a state of a web-based app, which may be equivalent to the state of the software app described above.

In this manner, the techniques described herein may improve search result relevance and enhance user experience. As one example, by identifying app state records specifying software app states that both match the search query and for which the corresponding apps are associated with relatively large quality values, the search results may be more relevant (e.g., useful) to the user than search results generated using the query alone. Additionally, by ranking app state records identified using the search query such that records specifying states of software apps having relatively large quality values are ranked higher than records specifying states of apps having relatively small quality values, those of the search results that are more relevant (e.g., useful) to the user may be displayed earlier, thereby enhancing the user's experience.

FIG. 1 illustrates an example environment that includes a search system 100, an app connection analysis system 108 (hereinafter, "analysis system 108"), one or more data sources 104, and one or more user devices 102 that communicate via a network 106. The network 106 through which the above-described systems and devices communicate may include any type of network, such as a local area network (LAN), a wide area network (WAN), and/or the Internet. As shown in FIG. 1, the search system 100 includes a search module 110, a search data store 112, and a result generation module 114, which are described in greater detail herein. As also shown, the analysis system 108 includes an app connection determination module 116 (hereinafter, "connection determination module 116"), an app connection data store 118 (hereinafter, "connection data store 118"), and an app connection record module 120 (hereinafter, "connection record module 120"), which are also described in greater detail herein. In some examples, the analysis system 108 may be a part of the search system 100, a part of another system or device, or a stand-alone system or device.

In general, the search system 100 may be configured to perform searches for states of software apps based on user-specified search queries (e.g., text strings) received from the user device(s) 102 and connections (e.g., links to and from other resources) associated with the apps. According to the techniques of this disclosure, the search system 100 may be configured to receive a search query from one of the user device(s) 102 via the network 106. For example, the user device 102 may receive the search query from a user of the device 102 and transmit the query to the search system 100 via the network 106. The search system 100 may be further configured to, upon receiving the search query from the user device 102, perform a search for one or more states of software apps stored (e.g., indexed) in the system 100 based on the query and based on app connection data generated using the analysis system 108. In some examples, the app connection data may indicate one or more connections associated with each of one or more software apps. Additionally, or alternatively, the app connection data may include a value of a quality metric, which may be referred to herein as a "quality value," associated with each of the software apps that indicates a degree of quality associated with the app. For example, the analysis system 108 may generate the quality value for each of the software apps based at least in part on the connections associated with the app. As a result of performing the search, the search system 100 may identify one or more states of software apps included in the system 100 and generate search results that specify the states (e.g., that enable a user device 102 to access the states). The search system 100 may also be configured to transmit the search results to the user device 102 via the network 106. The user device 102 may receive the search results from the search system 100 and display the results to the user as one or more user selectable links including image and/or text data. The user may select (e.g., touch, or "click on") any of the user selectable links on the user device 102. In response to the user selecting a particular user selectable link, the user device 102 may launch the software app referenced by the selected link (e.g., by the associated search result) and set the app into the state of the app specified by the link. Additionally, or alternatively, the user device 102 may download and install the software app and/or launch a web browser app and access a web equivalent of the state described above.

In the example of FIG. 1, the search system 100 generates the search results based on the search query, the app connection data, and information included in one or more app state records stored in the search data store 112. In this example, each app state record may specify a state of a so-called "native" app. The information included in the app state records may include one or more access mechanisms (AMs) that enable the user device(s) 102 to access the states specified by the records. The search system 100 transmits the AMs included in the app state records to the user device 102 as the search results, as described herein. The information may also include app state information (ASI) (e.g., text, such as various features and metadata) and other information (e.g., app state IDs and other data associated with the records), which the search system 100 may use to identify the app state records in the search data store 112, as also described herein. The search system 100 transmits the search results, including the AMs, to the user device 102. The user device 102 displays the search results to a user of the device 102 as one or more user selectable links that include the AMs. Example app state records are described with reference to FIGS. 4A-4B. The search data store 112, including one or more app state records, may include one or more databases, (e.g., inverted) indices, tables, files, or other data structures used to implement the techniques of this disclosure. In some examples, the search data store 112 may be included in one or more storage devices.

In this disclosure, a software app may refer to computer software that causes a computing device to perform a task. In some examples, a software app may be referred to as an "app," or a "program." Example apps include word processing apps, spreadsheet apps, messaging apps, media streaming apps, social networking apps, and games. Apps can be executed on a variety of different computing devices. For example, apps can be executed on mobile computing devices, such as smartphones, tablets, and wearable computing devices (e.g., smart watches, fitness bands, and headsets, such as smart glasses). Apps can also be executed on other types of computing devices having other form factors, such as laptop computers, desktop computers, and other consumer electronic devices (e.g., smart home appliances, home networking devices, and home automation devices). In some examples, apps may be installed on a computing device prior to a user purchasing the device. In other examples, the user may download and install apps on the computing device after purchasing the device. A native app, as used herein, may refer to an app that is installed and executed on a user device. A web-based app, in turn, may refer to an app that is accessible from a user device via a web browser app.

In some examples, the functionality of an app may be accessed on the computing device on which the app is installed. Additionally, or alternatively, the functionality of an app may be accessed via a remote computing device. In further examples, all of an app's functionality may be included on the computing device on which the app is installed. Such apps may function without communication with other computing devices (e.g., via the Internet). In additional examples, an app installed on a computing device may access information from other remote computing devices during operation. For example, a weather app installed on a computing device may access the latest weather information via the Internet and display the accessed information to the user. In still other examples, an app (e.g., a web-based app) may be partially executed by a user's computing device and partially executed by a remote computing device. For example, a web-based app may be executed, at least in part, by a web server and accessed by a web browser app of a user's computing device. Example web-based apps include web-based email sites, online auction sites, online retail sites, and other websites.

An AM, as used herein, may include any of a native app AM (hereinafter, "AAM"), a web AM (hereinafter, "WAM"), and an app download address (ADA). As such, a user device 102 of this disclosure may use an AM to access the functionality provided by a native or web-based app. For example, the user may select a user selectable link that includes the AM to access the functionality of the app. An AAM may be a string that references a native app and indicates one or more operations for a user device 102 (e.g., the app) to perform. If a user of the user device 102 selects a user selectable link that includes the AAM, the device 102 may launch the native app referenced by the AAM and (e.g., cause the app to) perform the operations indicated by the AAM. In other words, the user selecting the user selectable link may cause the user device 102 to launch the native app and set the app into a state (e.g., in which the app displays a graphical user interface (GUI), or screen) that corresponds to the operations. As a result, the native app may be configured to display one or more products, services, or vendors, to the user, e.g., via a display device of the user device 102. In this manner, the AAM may specify the state of the native app. The state, in turn, may refer to the operations indicated by the AAM and/or the outcome of the native app performing the operations in response to the user selecting the user selectable link that includes the AAM. A WAM may include a resource identifier that references a web resource (e.g., a page of a web-based app, or website). For example, the WAM may include a uniform resource locator (URL) (i.e., a web address) used with the hypertext transfer protocol (HTTP). If a user of a user device 102 selects a user selectable link that includes the WAM, the device 102 may launch a web browser app included on the device 102 and retrieve the web resource referenced by the resource identifier. Stated another way, if the user selects the user selectable link, the user device 102 may launch the web browser app and access a state (e.g., a page) of a web-based app, or website, specified by the WAM. In some examples, a WAM included in an app state record along with an AAM may specify a state within a web-based app that is an equivalent of a state within a native app specified by the AAM. An ADA (e.g., an alphanumeric string, such as a download link, binary data, or another data structure) may specify a location (e.g., a digital distribution platform, such as Google Play® by Google Inc.) where a native app (e.g., referenced by an AAM) may be downloaded. In some examples, an app state record may include an ADA with an AAM (and, e.g., a WAM). In these examples, the ADA may specify a location from which a native app referenced by the AAM may be downloaded.

For example, to generate the search results, the search module 110 may identify one or more app state records included in the search data store 112 based on the search query and the app connection data. Initially, the search module 110 may analyze the search query. The search module 110 may then identify one or more app state records included in the search data store 112 based on the (e.g., analyzed) search query and the app connection data. For example, the search module 110 may identify the app state records based on (e.g., text) matches between terms of the search query and terms of information included in the records. In some examples, the search module 110 may further identify the app state records based on the quality value associated with the native app referenced by an AAM included in each record, as indicated by the app connection data. For example, the search module 110 may identify each app state record by using the quality value associated with the native app referenced by the AAM included in the record as a boost factor as part of Lucene. Alternatively, the search module 110 may identify each app state record by determining that the quality value associated with the native app is greater than a threshold value, as described in greater detail herein. The search module 110 may then process (e.g., rank and select a subset of) the identified app state records. Specifically, the search module 110 may generate a result score for each of the identified app state records based on how well information included in the record matches the search query. In some examples, the search module 110 may further generate the result score for each identified app state record based on one or more connections associated with the native app referenced by an AAM included in the record and/or the quality value associated with the app, as further indicated by the app connection data. The search module 110 may then select one or more of the identified app state records having the highest one or more result scores and transmit indications of (e.g., app state IDs associated with) the selected records to the result generation module 114.

The result generation module 114 may identify the app state records selected by the search module 110 in the search data store 112 using the received indications (e.g., app state IDs). The result generation module 114 may then select one or more AMs (e.g., AAMs, WAMs, and/or ADAs) from the identified app state records and transmit the AMs to the user device 102 as search results. In some examples, the result generation module 114 may transmit additional data to the user device 102. For example, as described herein, the search module 110 may generate result scores for the app state records from which the AMs are selected (e.g., using various scoring features associated with the search query, the records, and/or the app connection data used to identify and/or rank the records). As such, each AM may be associated with a result score that indicates a rank of the AM relative to the other AMs. The result generation module 114 may transmit the result scores associated with the AMs to the user device 102 with the AMs. In other examples, the result generation module 114 may transmit link data and/or other data associated with the AMs (e.g., with the corresponding app state records) to the user device 102.

The search query may include text, numbers, and/or symbols (e.g., punctuation) entered into the user device 102 by the user. For example, the user may have entered the search query into a search field, or "box," of a search app executing on the user device 102. The user may have entered the search query into the search app using a touchscreen keypad, a mechanical keypad, and/or via speech recognition techniques and later caused the app to transmit the query to the search system 100. In some examples, the user may have entered the search query into the search app using various autosuggest (e.g., so-called "autocomplete") techniques. Additionally, or alternatively, the search query may be generated or selected based on an interaction between the user and the user device 102, such as, e.g., in response to the user selecting a link that corresponds to a predefined search query within an app executing on the device 102. In some examples, the search app may be a native app dedicated to search, or a more general app, such as a web browser app. The app connection data, in turn, may include text, numbers, symbols, and/or machine-readable (e.g., binary) data used by the analysis system 108 to represent one or more connections associated with a native app and/or a quality value indicating a degree of quality associated with the app and generated based at least in part on the connections.

In some examples, the user device 102 may transmit additional data to the search system 100 along with the search query. The search query and the additional data may be referred to herein as a "query wrapper." The additional data may include geo-location data associated with the user device 102, platform data for the device 102 (e.g., a type and/or a version, an operating system (OS), and/or a web browser app associated with the device 102), an identity of the user (e.g., a username), partner specific data, and/or other data (e.g., indications of one or more native apps that are installed on the device 102). The user device 102 may transmit the query wrapper to the search system 100. The search system 100 may receive the query wrapper and use the search query and, e.g., the additional data included in the wrapper, to generate the search results and provide the results to the user device 102.

Figures 7A, 7B, 7C:
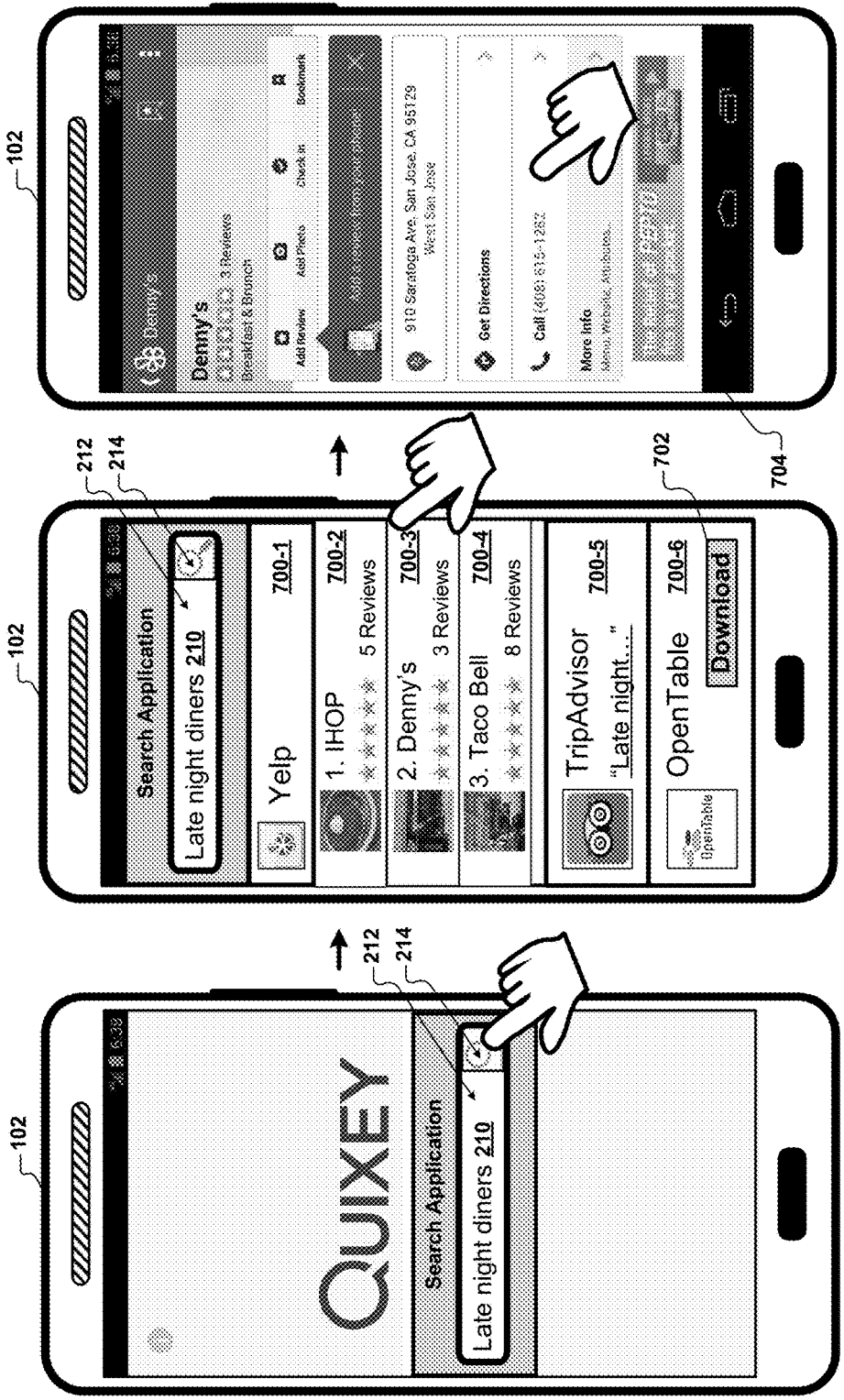
FIGS. 7A-7C depict example graphical user interfaces (GUIs) that may be generated on a user device according to the present disclosure.

In other examples, the search system 100 may transmit the search results, including the AMs, to the user device 102 with additional data. For example, the search system 100 may transmit link (e.g., text and/or image) data that the user device 102 may use to generate the user selectable links for the AMs included in the search results. For instance, each user selectable link may include a portion of the link data that the user of the user device 102 may select (e.g., touch, or click on). Each user selectable link may also be associated with one of the AMs included in the search results, such that when the user selects the link, the user device 102 launches a native app and sets the app into a state of the app specified by the AM (e.g., after first downloading and installing the app on the device 102). The link data included in the user selectable link may indicate (e.g., textually and/or graphically) the state of the native app specified by the link. Example user selectable links are illustrated in FIG. 7B.

Figure 2:
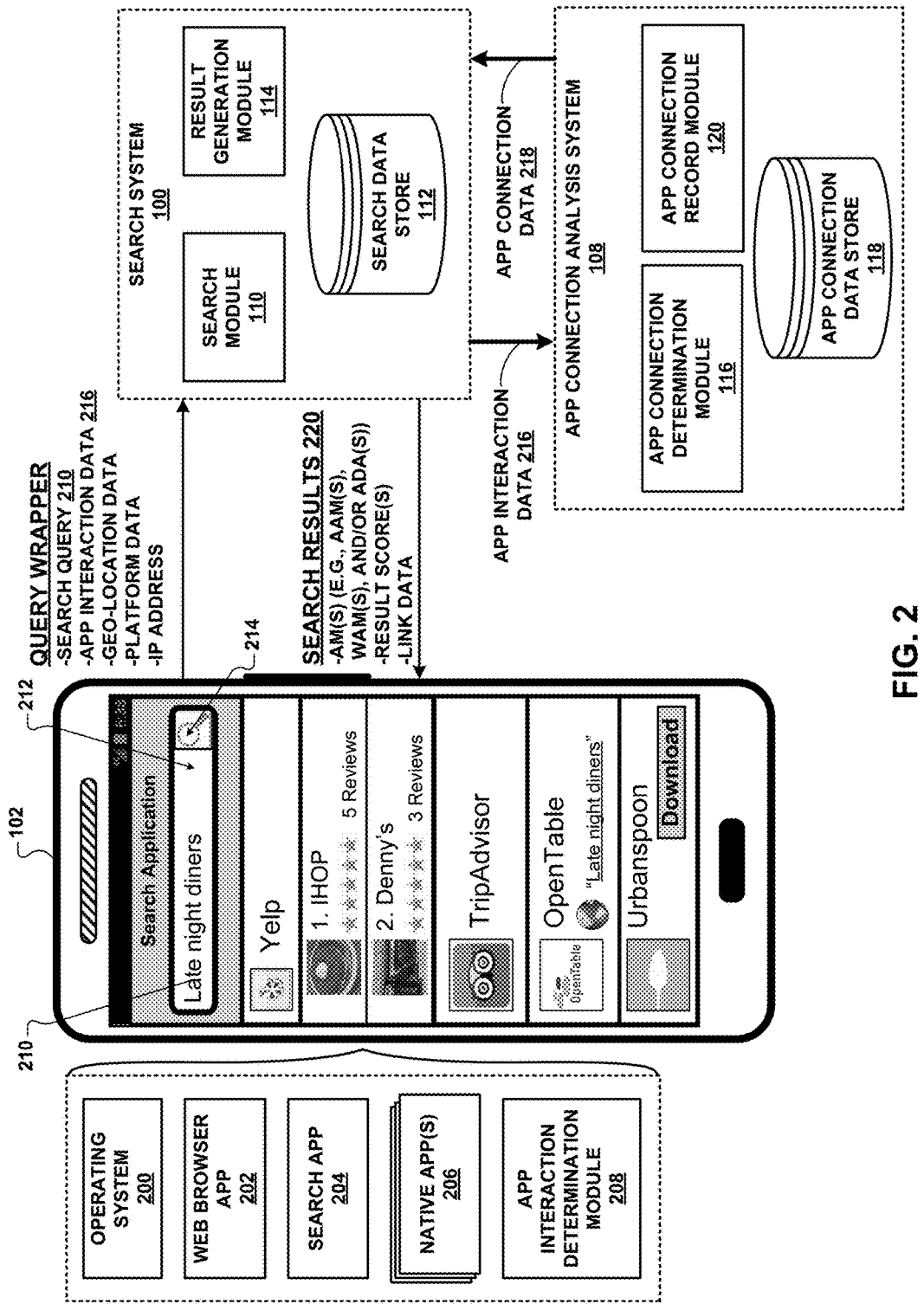
FIG. 2 illustrates an example user device in communication with an example search system and an example app connection analysis system.

The user device(s) 102 may be any computing devices capable of providing search queries and, e.g., app interaction data, to the search system 100 (and, e.g., the analysis system 108) and receiving search results from the system 100. The user device(s) 102 may include any of smartphones, and tablet, laptop, and desktop computing devices. The user device(s) 102 may also include any computing devices having other form factors, e.g., those included in vehicles, gaming devices, televisions, or other appliances (e.g., networked home automation devices and home appliances). The user device(s) 102 may use a variety of different operating systems or platforms (e.g., an OS 200, as shown in FIG. 2). In the event the user device 102 is a mobile device, the device 102 may operate using an OS such as ANDROID® by Google Inc., IOS® by Apple Inc., or WINDOWS PHONE® by Microsoft Corporation. In the event the user device 102 is a laptop or desktop computing device, the device 102 may use an OS such as MICROSOFT WINDOWS® by Microsoft Corporation, MAC OS® by Apple Inc., or LINUX® (LINUX is the registered trademark of Linus Torvalds in the U.S. and other countries). In general, the user device(s) 102 may interact with any of the systems 100, 108 using operating systems other than those described herein, whether presently available or developed in the future.

The user device(s) 102 may communicate with the search system 100 (and, e.g., the analysis system 108) via the network 106. In general, the user device(s) 102 may communicate with any of the systems 100, 108 using any app that can transmit search queries and, e.g., app interaction data, to one or more of the systems 100, 108, and receive search results from the search system 100. In some examples, the user device(s) 102 may include an app that is dedicated to interfacing with one or more of the systems 100, 108, such as an app dedicated to searches (e.g., a search app 204, as also shown in FIG. 2). In other examples, the user device(s) 102 may communicate with any of the systems 100, 108 using a more general app, such as a web browser app (e.g., a web browser app 202, as further shown in FIG. 2). An app included on a user device 102 to communicate with one or more of the systems 100, 108 may display a GUI including a search field, or box, into which a user may enter search queries. For example, the user may enter the search queries using a touchscreen, a physical keyboard, a speech-to-text program, or another form of user input available on the user device 102. The app may be configured to transmit the search queries to the search system 100 (e.g., in response to user inputs). In some examples, the app may be further configured to determine (e.g., via an app interaction determination module 208, as shown in FIG. 2) interactions (e.g., data exchanges) between native apps that are installed on the user device 102 (e.g., one or more native apps 206, as also shown in FIG. 2) and other resources. In these examples, the app may be configured to transmit app interaction data indicating the interactions to one or more of the systems 100, 108 (e.g., with the search queries, or separately).

In some examples, the user device 102 may use the same (e.g., dedicated, or more general) app to display the search results received from the search system 100 to the user. For example, the user device 102 may display the search results via the GUI used to receive the search queries from the user and transmit the queries to one or more of the systems 100, 108, as described herein. The GUI may display the search results to the user in a variety of different ways, depending on the information transmitted by the search system 100 to the user device 102 as part of the results. As previously described, the search results may include one or more AMs, along with link data, result scores, and/or other information used to generate user selectable links for the AMs. The GUI may display the search results to the user as a list of the user selectable links, including text and/or images. For instance, the text and/or images (e.g., "icons," or "screenshots") may describe the states of the native apps specified by the AMs. In additional examples, the GUI may display the search results as the list of the user selectable links arranged under the search field into which the user has entered a search query. For example, the GUI may arrange the user selectable links by result scores associated with the links, i.e., with the AMs for which the links are generated, or using other logic. In other examples, the GUI may also group the user selectable links by the corresponding native apps (e.g., using native app headers). In additional examples, the search system 100 may transmit the search results to the user device 102 via an app programming interface (API). In these examples, the GUI used to display the search results on the user device 102 may be determined (e.g., defined) by a third-party app (e.g., that is associated with the API). For example, the GUI may implement visual (e.g., include text and/or image data), audible (e.g., include a text-to-speech output), and/or any other techniques of presenting the search results to the user on the user device 102.

The data source(s) 104 may be any sources of data that the search system 100 may use to generate and/or update the search data store 112. For example, the search system 100 may use the data source(s) 104 to generate and/or update one or more databases, indices, tables, files, or other data structures (e.g., app state records) included in the search data store 112. As an example, the search system 100 may generate new app state records and/or update existing app state records based on data retrieved from the data source(s) 104. For instance, the search system 100 may include one or more modules (not shown) that generate new app state records and/or update existing app state records based on the data. In some examples, some or all of the data included in the search data store 112 may be manually generated by a human operator.

The data source(s) 104 may include a variety of different data providers. For example, the data source(s) 104 may include data from app developers, such as app developer websites and data feeds provided by app developers. The data source(s) 104 may also include operators of digital distribution platforms configured to distribute apps to user devices. The data source(s) 104 may further include other websites, such as websites that include web logs (i.e., blogs), app reviews, or other data related to apps. Additionally, the data source(s) 104 may include social networking sites, such as "FACEBOOK®" by Facebook Inc. (e.g., Facebook posts) and "TWITTER®" by Twitter Inc. (e.g., text from tweets). The data source(s) 104 may include other types of data sources, which may have various types of content and update rates. In some examples, the search system 100 may retrieve data from the data source(s) 104, including any type of data related to native apps and/or native app functionality. The search system 100 may then generate one or more app state records based on the data and store the records in the search data store 112. In other examples, some or all of the data (e.g., ASI) included in the app state records of the search data store 112 may be manually generated by a human operator. Additionally, in some examples, the data included in the app state records may be updated over time so that the search system 100 provides up-to-date search results in response to user-specified search queries received from the user device(s) 102.

FIG. 2 illustrates an example of one of the user device(s) 102 in communication with the search system 100 and analysis system 108. Specifically, FIG. 2 depicts example interactions and data exchanged among the user device 102, search system 100, and analysis system 108. As shown in FIG. 2, the user device 102 may transmit a query wrapper to the search system 100. The query wrapper may include a search query 210, app interaction data 216, geo-location data, platform data, and/or other data (e.g., an IP address) associated with the user, the user device 102, and/or the query 210. For example, the user may have entered the search query 210 into a search field 212 of a GUI of a search app 204 included on the user device 102. The user may have then caused the search app 204 to submit the search query 210 to the search system 100 (i.e., as part of the query wrapper) by selecting a search button 214 of the GUI. In this example, the app interaction data 216 may indicate one or more interactions between one or more native apps 206 included on the user device 102 and one or more other resources. The user device 102 (e.g., the search app 204) may have generated the app interaction data 216 and submitted the data 216 to the search system 100 (e.g., also as part of the query wrapper). For example, the user device 102 may have generated the app interaction data 216 using an app interaction determination module 208 included on the device 102 (e.g., as part of the search app 204). In some examples, the user device 102 may determine the app interaction data 216 prior to, during (e.g., in response to), or after the user enters and/or submits the search query 210.

Upon receiving the query wrapper from the user device 102, the search system 100 may generate one or more search results 220 based on the search query 210 and app connection data 218 generated by the analysis system 108. For example, the analysis system 108 may generate the app connection data 218 based at least in part on the app interaction data 216 received from the user device 102 (e.g., via the search system 100). To generate the search results 220, the search system 100 may identify one or more app state records included in the search data store 112 based on the search query 210 and, e.g., the app connection data 218. The search system 100 may further generate results scores for (e.g., rank) the identified app state records, e.g., also based on the app connection data 218. The search system 100 may then select one or more of the identified and ranked app state records based on the corresponding results scores, select one or more AMs (e.g., AAM(s), WAM(s), and/or ADA(s)) from the selected records, and transmit the AMs as the search results 220 to the user device 102 (e.g., along with link data, result scores, and/or other data associated with and/or selected from the records).

In the example of FIG. 2, upon receiving the search results 220 from the search system 100, the user device 102 may display the results 220 to the user as one or more user selectable links. For example, the user device 102 may generate the user selectable links such that each link is associated with (e.g., includes) one or more of the AMs included in the search results 220. As described herein, each AM included in the search results 220 may specify a state of a native app (e.g., as in the case of an AAM), a state of a web-based app (e.g., as in the case of a WAM), or a location from which a native app may be downloaded (e.g., as in the case of an ADA). As a result, when the user selects (e.g., touches, or clicks on) each user selectable link, the user device 102 may launch the corresponding app (e.g., one of the native app(s) 206 or the web browser app 202 included on the device 102) and set the app into a state (e.g., a native app screen, or a web page) specified by the AM (e.g., an AAM, or a WAM) included in the link. Additionally, or alternatively, upon the user selecting the user selectable link, the user device 102 may download the corresponding native app from a location specified by the AM (e.g., an ADA) included in the link and install the app on the device 102. Upon downloading and installing the native app, the user device 102 may launch the app and set the app into a state specified by another AM (e.g., an AAM) included in the link, in a similar manner as described above. In some examples, the user device 102 may generate the user selectable links using the link data also included in the search results 220. For example, the link data may include any of text (e.g., describing a name of an app and/or a state of the app) and image data (an icon, or screenshot, associated with the app and/or state). In this manner, the link data included in (e.g., used to generate) each user selectable link may describe the app and/or the state of the app associated with the link. The user device 102 may further arrange (e.g., order, or rank) the user selectable links as part of displaying the links to the user based on the result scores also included in the search results 220. For example, the user device 102 may assign each user selectable link the result score associated with the app state record from which the one or more AMs included in the link were selected. The user device 102 may then order the user selectable links based on the corresponding result scores (e.g., display higher-ranking links higher within a list of user selectable links). Example search results 220 displayed to a user of a user device 102 as user selectable links are described with reference to FIGS. 7A-7C.

FIG. 3A illustrates an example of the search system 100. As described herein, the search system 100 generates one or more search results 220 based on a search query 210 received from one of the user device(s) 102, app connection data 218 (e.g., an indication of one or more connections associated with a native app and/or a quality value associated with the app) generated by the analysis system 108, and data included in app state records of the search data store 112. Specifically, the search module 110 identifies one or more app state records included in the search data store 112 based on the search query 210 and, e.g., the app connection data 218. In some examples, the search system 100 further ranks the identified app state records, e.g., also based on the app connection data 218. The search module 110 then transmits one or more app state IDs 222 that identify the identified and, e.g., ranked, app state records to the result generation module 114. The result generation module 114 receives the app state IDs 222 from the search module 110, identifies the app state records in the search data store 112 using the IDs 222, and selects one or more AMs from the identified records. The result generation module 114 then transmits the selected AMs to the user device 102 as the search results 220 (e.g., with link data, result scores, and/or other data associated with the identified app state records).

FIG. 3B is a functional block diagram of an example search module 110, search data store 112, and analysis system 108. The search module 110 includes a query analysis module 300, a consideration set generation module (hereinafter, "set generation module") 302, and a consideration set processing module (hereinafter, "set processing module") 304. The query analysis module 300 receives a search query 210 from one of the user device(s) 102 (e.g., as part of a query wrapper) and analyzes the query 210 (e.g., performs any of tokenization, filtering, stemming, synonymization, and stop word removal with respect to the query 210). The set generation module 302 identifies one or more app state records included in the search data store 112 based on the (e.g., analyzed) search query 210 and, e.g., app connection data 218 received from the analysis system 108. As described herein, the app connection data 218 may indicate connections associated with native apps referenced by AAMs included in app state records stored in the search data store 112 and/or information generated using the connections (e.g., quality values indicating a degree of quality associated with the apps). For example, the set generation module 302 may identify one or more app state records included in the search data store 112 based on one or more (e.g., text) matches between one or more terms of the search query 210 and one or more terms of information (e.g., ASI and/or app state IDs) included in the records. In a specific example, the set generation module 302 may identify the app state records using the search query 210 as an input to Lucene. In some examples, the set generation module 302 may further identify at least one of the app state records based on the quality value associated with (e.g., included in) the record, as indicated by the app connection data 218. For example, the set generation module 302 may identify the app state record by using the quality value as a boost factor in Lucene. Alternatively, the set generation module 302 may identify the app state record by determining that the quality value is greater than a threshold value. For example, the search module 110 may generate the threshold value dynamically, e.g., based on the search query 210. As a specific example, the search module 110 may generate a relatively high threshold value for some search queries 210 (e.g., "mobile banking" or "deposit check") and a relatively low threshold value for other search queries 210 (e.g., "play online games"). The identified app state records may be referred to herein as a "consideration set."

The set processing module 304 may process (e.g., score and select a subset of) the consideration set. For example, the set processing module 304 may generate a result score for each app state record of the consideration set, thereby ranking the records, and select one or more records from the set having the highest one or more result scores. In some examples, the set processing module 304 may generate the result score for at least one of the app state records of the consideration set using the app connection data 218 (e.g., an indication of one or more connections and/or a quality value associated with the native app referenced by the AAM included in the record). The set processing module 304 may then transmit one or more app state IDs 222 associated with (e.g., included in) the (e.g., selected) app state records of the consideration set to the result generation module 114, as described above.

The information conveyed by the search results 220 may depend on how the set processing module 304 generates the result scores for the app state records of the consideration set. For example, for each app state record, the corresponding result score may be generated based on various features associated with the record, such as relevance of the app state of the native app specified by the record to the search query 210, popularity of the state, and/or other properties of the state, depending on the one or more parameters the set processing module 304 uses to score the app state records. The set processing module 304 may generate the result scores for the app state records in a variety of different ways. In some examples, the set processing module 304 generates a result score for an app state record based on one or more scoring features. The scoring features may be associated with the app state record, the search query 210, and/or other data (e.g., app connection data 218). An app state record scoring feature (hereinafter, "record scoring feature") may be based on any data associated with an app state record. For example, a record scoring feature may be based on any data included in ASI of an app state record. An example record scoring feature may be a popularity score (e.g., based on user ratings of a native app or a state of the app) associated with an app state record. A query scoring feature may include any data associated with the search query 210. For example, a query scoring feature may include any of a number of words in the search query 210, the popularity of the query 210, and an expected frequency of the words in the query 210. A record-query scoring feature may include any data generated based on information associated with both an app state record and a search query 210 that resulted in identification of the record by the set generation module 302. For example, a record-query scoring feature may include any parameters that indicate how well terms of a search query 210 match terms of ASI (and/or an app state ID) of an app state record identified using the query 210. In some examples, as described herein, the set processing module 304 may generate a result score for an app state record based on the app connection data 218. In these examples, an "app connection" scoring feature may include any data associated with the app connection data 218 (e.g., an indication of one or more connections associated with a native app and/or a quality value indicating a degree of quality associated with the app and generated based at least in part on the connections). In some examples, the set processing module 304 may generate a result score for an app state record based on whether the native app referenced by the AAM included in the record is, or is not, associated with one or more connections, as indicated by the app connection data 218. In other examples, the set processing module 304 may generate the result score based on a quality value indicating a degree of quality associated with the native app and generated based at least in part on the connections, as also indicated by the app connection data 218. In still other examples, the set processing module 304 may generate the result score based on any combination of the connections and the quality value. In general, the set processing module 302 may generate a result score for an app state record using any of the record, query, record-query, app connection scoring features, and/or any additional scoring features not explicitly listed.

In some examples, to generate the result scores for the app state records of the consideration set, the set processing module 304 may include one or more machine-learned models (e.g., a supervised learning model, for example, including regression) configured to receive one or more of the record, query, record-query, and app connection scoring features described herein. For example, the set processing module 304 may pair the search query 210 with each app state record and calculate a vector of features for each (query, record) pair. The vector of features may include one or more record, query, record-query, and app connection scoring features. The set processing module 304 may then input the vector of features into a machine-learned relevance (MLR) model to calculate a result score for the app state record (e.g., simultaneously based on the features). In some examples, the MLR model may include a set of (e.g., gradient-boosted) decision trees. In other examples, the MLR model may be trained by a simple form of logistic regression. In still other examples, the machine-learned task described herein can be framed as a semi-supervised learning task, where a minority of training data is labeled with human-curated result scores and the rest of the data is used without such labels.

As described herein, the result scores associated with the app state records (e.g., the AMs included therein) may be used in various different ways. In some examples, the result scores may be used to rank (e.g., order) the AMs in a list. In these examples, a higher result score may indicate that the corresponding AM (e.g., an AAM specifying a state of a native app) is more relevant to the user than an AM (e.g., an AAM specifying a state of another native app) having a smaller result score. In examples where the search results 220 are displayed as a list of user selectable links on the user device 102, the links including AMs associated with larger result scores may be listed closer to the top of the list (e.g., near the top of the screen). In these examples, links including AMs having lower result scores may be located farther down the list (e.g., off screen) and may be accessed by scrolling down the screen of the user device 102.

FIGS. 4A-4B illustrate example app state records 400A, 400B that may be included in the search data store 112. FIG. 4A illustrates a general example of an app state record 400A. The app state record 400A of FIG. 4A includes information related to (e.g., specifying) a state of a native app. As shown in FIG. 4A, the app state record 400A includes an app state ID 402A that uniquely identifies the record 400A among other app state records included in the search data store 112. As also shown, the app state record 400A includes ASI (e.g., text) 404A that describes the state specified by the record 400A, and which may be used to identify the record 400A within the search data store 112. As further shown, the app state record 400A includes one or more AMs 406A (e.g., AAMs, WAMs, and/or ADAs) that enable a user device 102 to access the state specified by the record 400A within the native app (and/or an equivalent state within a web-based app). For example, the AM(s) 406A may include one or more AAMs that each reference the native app and indicate one or more operations for the app (e.g., the user device 102) to perform. The native app performing the operations may set the app into the state. Additionally, or alternatively, the AM(s) 406 may include one or more ADAs/or WAMs. The ADAs and/or WAMs may be selected along with the AAMs from the app state record 400A and transmitted to a user device 102 as part of search results 220. The ADAs may each specify a location (e.g., a digital distribution platform, such as Google Play® by Google Inc.) where a user device 102 may download the native app referenced by the AAMs. In response to a user selecting a user selectable link that includes the ADA on a user device 102, the device 102 may download the native app using the ADA and install the app. The user device 102 may further launch the native app and set the app into the state specified by the AAMs also included in the user selectable link. The WAM may specify a state of a web-based app that is equivalent (e.g., analogous) to the state specified by the AAMs. In response to a user selecting a user selectable link that includes the WAM on a user device 102, the device 102 may launch the web browser app 202 included on the device 102 and access the equivalent state of the web-based app using the WAM. For example, the WAM may include a resource identifier that references a web resource (e.g., a page of the web-based app, or website). For instance, the WAM may include a URL (i.e., a web address) used with HTTP. Upon the user selecting the user selectable link including the WAM, the user device 102 may launch the web browser app 202 and retrieve the web resource referenced by the resource identifier (e.g., access the state, or page, of the web-based app, or website, specified by the WAM). As still further shown, the app state record 400A may include link data 408A, which may include text describing and/or image data (e.g., one or more icons, or screenshots) associated with the state of the native app specified by the record 400A and/or the app itself.

As shown in FIG. 4A, the app state record 400A may optionally include app connection data 410A. The app connection data 410A may indicate one or more connections associated with the native app referenced by the AAMs included in the app state record 400A. Additionally, or alternatively, the app connection data 410A may indicate a quality value indicating a degree of quality associated with the native app and generated based at least in part on the connections. As described herein, the analysis system 108 may initially generate app connection data 218 indicating the connections and/or the quality value. The search system 100 may then store the app connection data 218 in the app state record 400A as the app connection data 410A and later use the data 410A to identify and/or rank the record 400A in response to receiving a search query 210 from one of the user device(s) 102. In some examples, the search system 100 may store the app connection data 218 (e.g., the indication of the connections and/or the quality value) in the app state record 400A as part of the ASI 404A.

In additional examples, the app state record 400A may also include information describing values of one or more metrics associated with a person, place, or thing described in the record 400A. Example metrics include the popularity of the place and/or (e.g., user) ratings of the place. For example, if the app state record 400A describes a song, a metric associated with the song may be based on the popularity of the song and/or (e.g., user) ratings of the song. The information included in the app state record 400A may also be based on measurements associated with the record 400A, such as how often the record 400A is retrieved during a search and how often user selectable links for any of the AM(s) 406A of the record 400A are selected by a user. The information may also indicate whether the app state record 400A includes an AAM for a default state, or a deeper state, of the native app. In some examples, the search system 100 (e.g., the set processing module 304) may use this information to generate a result score for the app state record 400A (e.g., upon identifying the record 400A and as part of ranking the record 400A among other identified app state records), as described herein.

FIG. 4B illustrates a specific example of an app state record 400B that specifies a state of the native app "YELP®" by Yelp Inc. (hereinafter, "Yelp"). The state specified by the app state record 400B corresponds to an entry in Yelp for the restaurant "Amarin Thai Cuisine" located in Mountain View, Calif. As shown in FIG. 4B, the app state record 400B includes an app state ID "Yelp—Amarin Thai Cuisine, Mountain View, Calif." 402B that uniquely identifies the record 400B among other app state records included in the search data store 112. In other examples, the app state ID 402B may be a numeric value or have another (e.g., machine-readable) representation. As further shown, the app state record 400B includes ASI 404B that describes the state specified by the record 400B. The ASI 404B describes a restaurant category, a description, user reviews, and/or any other information related to the Amarin Thai Cuisine restaurant associated with the state specified by the app state record 400B. In some examples, the ASI 404B may also describe one or more functions provided by the state, such as, e.g., "make a restaurant reservation," "read user reviews," and "write a user review." As also shown, the app state record 400B includes one or more AMs 406B (e.g., AAMs, WAMs, and/or ADAs) that enable a user device 102 to access the state specified by the record 400B in Yelp.

As shown in FIG. 4B, in some examples, the app state record 400B may include link data 408B, including text describing and/or image data associated with the entry for the Amarin Thai Cuisine restaurant in Yelp. As also shown, the app state record 400B may also include app connection data 410B indicating one or more connections associated with Yelp and/or a quality value indicating a degree of quality associated with Yelp generated based at least in part on the connections. As described herein, the analysis system 108 may initially generate app connection data 218 indicating the connections and/or quality value. The search system 100 may then store the app connection data 218 in the app state record 400B as the app connection data 410B and later use the data 410B to identify and/or rank the record 400B in the manner described herein.

FIG. 5A illustrates example interactions and data exchanged among one of the user device(s) 102, the search system 100, the analysis system 108, and one or more APIs (e.g., servers and data stores) 500-1 . . . 500-N. For example, the API(s) 500-1 . . . 500-N may be associated with one or more native apps referenced by one or more AAMs included in one or more app state records stored in the search data store 112. As described herein, the analysis system 108 generates app connection data 218 for each of one or more native apps referenced by one or more AAMs included in one or more app state records stored in the search data store 112. In other words, the analysis system 108 generates the app connection data 218 for each of one or more of the app state records. For example, the analysis system 108 may generate the app connection data 218 for a particular one of the native apps and associate the data 218 with (e.g., store the data 218 within) each of one or more app state records included in the search data store 112 that specify states of the app. As further described herein, app connection data 218 associated with a particular native app (e.g., with a corresponding app state record included in the search data store 112 that specifies a state of the app) may indicate one or more connections associated with the app and/or information (e.g., a quality value) generated for the app (e.g., for the record) based on the connections. In some examples, the analysis system 108 may generate app connection data 218 for a subset of the app state records included in the search data store 112 (e.g., some native apps may not be associated with connections). In other examples, for a given app state record included in the search data store 112, the analysis system 108 may generate app connection data 218 that indicates a subset of the connections associated with the native app referenced by the AAM included in the record (e.g., the system 108 may be unable to identify all connections associated with the app).

In this disclosure, a connection associated with a native app may include any of a variety of connection types. In some examples, the connection may refer to a so-called "outbound" link included in the native app that is used by the app to retrieve data from another resource (e.g., a "deep link," or a passed intent to an activity that is not part of the app, as in the case of ANDROID® by Google). In other examples, the connection may refer to a so-called "inbound" link included in another resource that is used by the resource to retrieve data from the native app. In further examples, the connection (e.g., the outbound or inbound link) may be between the native app and another, different native app. In other words, the connection may facilitate the exchange of data between two native apps. In other examples, the connection may be between the native app and a resource associated with a native app, such as an API associated with a native app, or a "native API" (e.g., one or more servers and data stores used by a native app), a native app library (e.g., portions of code associated with a native app), or another resource, such as a website associated with a native app (e.g., a web-equivalent of a native app). For example, the connection may be between the native app and an API, an app library, and/or a website associated with another native app. In some examples, the native app may include the native app library (e.g., instructions) associated with the other native app. In these examples, the native app library being included in the native app may constitute a connection between the app and the other native app. In still other examples, the connection may be between the native app and a non-app resource, such as a website (e.g., a web-based app not associated with a native app), an advertisement (ad) network, or another web resource (e.g., a multiplayer game server). As such, the connection may be directional and have an associated type. In this manner, a connection associated with a native app, as described herein, may be a connection between the app and various different resources.

Figure 5C:
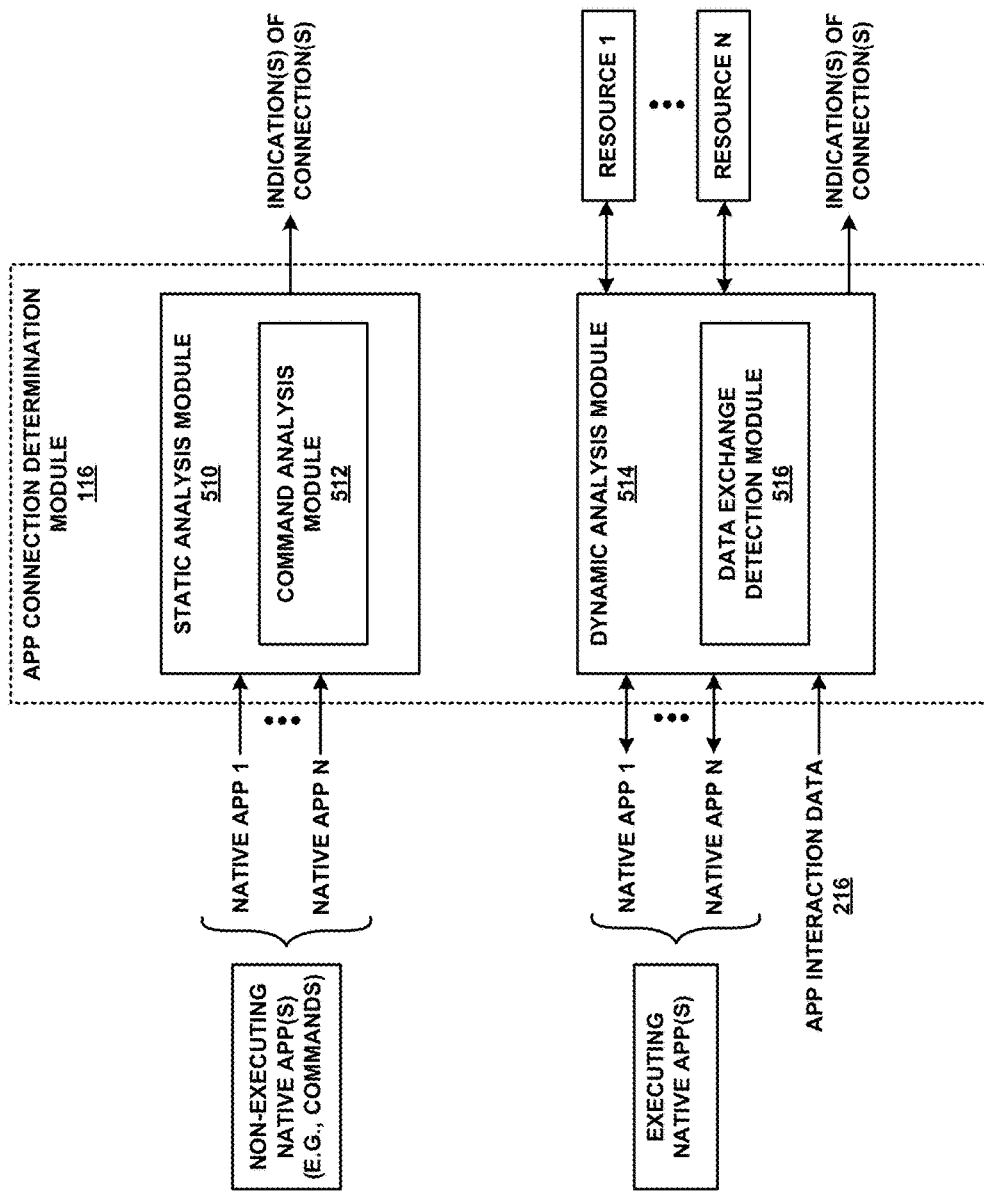
FIG. 5C illustrates an example app connection determination module.
Figure 6D:
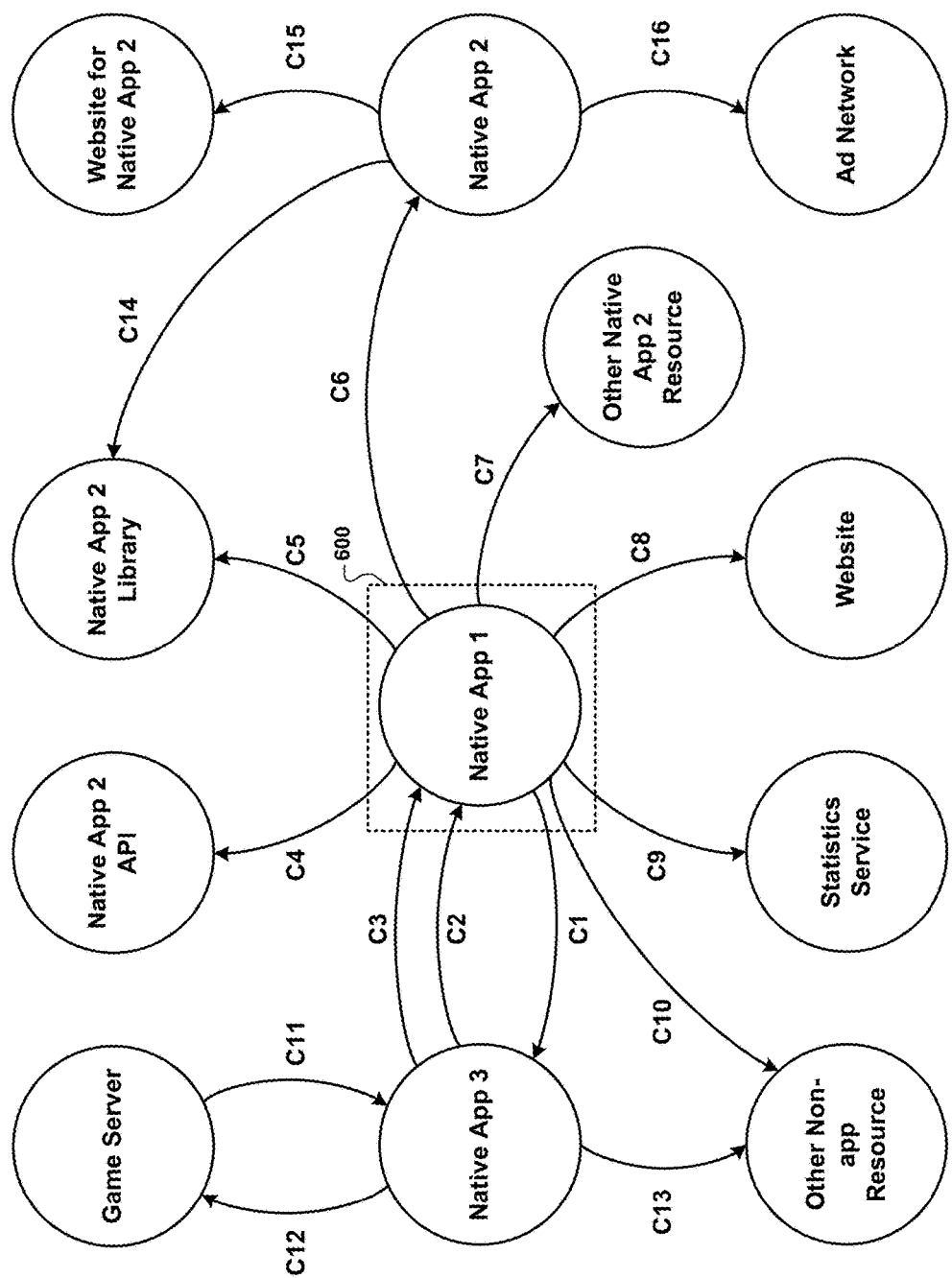

As shown in FIG. 5A, the analysis system 108 includes the connection determination module 116, connection data store 118, and connection record module 120. The connection determination module 116 may generate the app connection data 218 for each of the one or more native apps referenced by the one or more AAMs included in the one or more app state records stored in the search data store 112. The connection record module 120 may generate one or more connection records used to store the app connection data 218 generated by the connection determination module 116 and store the records, including the data 218, in the connection data store 118. In some examples, upon the connection determination module 116 generating the app connection data 218, the module 116 may generate an app connection graph (e.g., as shown in FIG. 6D) representing the data 218, i.e., one or more connections associated with each native app. The connection record module 120 may then generate a connection record and store the record, including the app connection graph, in the connection data store 118.

In this example, to generate app connection data 218 for a native app referenced by an AAM included in a particular app state record stored in the search data store 112, the connection determination module 116 may be configured to perform any of the following actions. Initially, the connection determination module 116 may determine (e.g., identify) one or more connections associated with the native app. For example, to determine the connections, the connection determination module 116 may perform any combination of static and dynamic connection analyses with respect to the native app. As one example, to perform the static connection analysis, the connection determination module 116 may analyze one or more commands (e.g., human-readable programming language instructions, or machine-readable instructions specifying operations to be performed by a processing unit) associated with the native app (e.g., with an executable binary object associated with the app). In some examples, the commands may be a part of various code components of the native app having various levels of abstraction, and which may interoperate via messages, events, and/or so-called "intents." For example, the connection determination module 116 may analyze the commands associated with the native app by accessing an API (e.g., an API data store) associated with the app, or another resource that stores the commands and where the commands are not being executed by a processing unit (e.g., in an "off-line" manner). For instance, as shown in FIG. 5A, the connection determination module 116 may access one of the API(s) 500-1 . . . 500-N (e.g., one of API data store(s) 502-1 . . . 502-N included therein) associated with the native app. As described herein, the API(s) 500-1 . . . 500-N may be associated with native apps 504-1 . . . 504-N referenced by AAMs included in app state records 400A-1 . . . 400A-N stored in the search data store 112, as indicated by dashed line 506. As a result of performing the analysis, the connection determination module 116 may identify one or more commands configured to invoke communication (e.g., data exchange) between the native app and one or more other resources. For example, as shown in FIG. 5C, the connection determination module 116 may include a static analysis module 510 that, in turn, includes a command analysis module 512 configured to analyze commands associated with native apps without fully executing the apps and determine connections for each app based on the commands. In this manner, the connection determination module 116 may determine one or more connections corresponding to one or more outbound links associated with the native app. To determine connections corresponding to inbound links associated with the native app, the connection determination module 116 may perform static connection analysis with respect to another native app that retrieves data from the app, in a similar manner as described above.

As another example, to perform the dynamic connection analysis, the connection determination module 116 may monitor one or more live interactions (e.g., data exchanges) between the native app and one or more other resources. For example, the connection determination module 116 may detect the interactions between the native app (e.g., in response to a user input) and resources while the app executes on a computing device, such as a user device 102, or an API associated with the app (e.g., in a "real-time" manner). Alternatively, the connection determination module 116 may receive an indication of the interactions from a computing device that executes the native app. For example, as shown in FIG. 5A, the connection determination module 116 may receive app interaction data 216 indicating the interactions from the user device 102 (e.g., assuming the native app is included on the device 102). In other examples, the connection determination module 116 may receive the app interaction data 216 from another location (e.g., from one of the API(s) 500-1 . . . 500-N associated with the native app). By monitoring the interactions, the connection determination module 116 may identify one or more resources with which the native app is configured to communicate (e.g., exchange data). For example, as also shown in FIG. 5C, the connection determination module 116 may include a dynamic analysis module 514 that, in turn, includes a data exchange detection module 516 configured to monitor interactions (e.g., data exchanges) between executing native apps and other resources and determine connections for each app based on the interactions. Additionally, or alternatively, as also shown, the data exchange detection module 516 may be configured to receive an indication of the interactions (e.g., as app interaction data 216) and determine the connections for each native app based on the data 216. In this manner, the connection determination module 116 may determine one or more connections corresponding to one or more outbound and/or inbound links associated with the native app. In general, the connection determination module 116 may determine one or more connections associated with the native app by performing any combination of the static and dynamic connection analyses, or by receiving equivalent or analogous inputs from a parallel system (or a set of multiple systems) tasked with performing the static and/or dynamic connection analysis.

In some examples, another system or device, rather than the connection determination module 116, may perform any of the static and dynamic connection analyses described above. In these examples, the connection determination module 116 may receive an output of this system or device and determine the one or more connections associated with the native app based on the output. In some examples, the connection determination module 116 may determine the connections based on known markers included in the output. In other examples, the connection determination module 116 may determine the connections based on outputs corresponding to static and/or dynamic connection analyses performed for other native apps.

In some examples, to generate the app connection data 218 for the native app, the connection determination module 116 may be configured to identify any combination of one or more so-called "explicit" and "inferred" connections associated with the app. As one example, to identify an explicit connection associated with the native app, the connection determination module 116 may identify a connection between the app and another resource (e.g., another native app, or a non-app resource). For instance, the connection determination module 116 may identify a user selectable link included in the native app that links to (e.g., opens a state of) another native app, or a website that does not correspond to a native app. As another example, to identify an inferred connection associated with the native app, the connection determination module 116 may identify a connection between the app and a website (e.g., a user selectable link included in the app that links to the website). In this example, the website may correspond to another native app (e.g., the website may be a web-based app that is a web-equivalent of the other app). Upon identifying the connection between the native app and the website, the connection determination module 116 may infer the connection between the app and the other native app. In other examples, the connection determination module 116 may similarly infer the connection between the native app and the other native app based on a connection between the app and any of an API, an app library, and another resource associated with the other app.

In a specific example, the connection determination module 116 may initially analyze each of one or more native apps, e.g., each represented by a native app binary, and generate app connection data 218 that indicates (e.g., using one or more alphanumeric strings) one or more connections associated with each app. For example, an input to the connection determination module 116 may be the string "YouTube_1_Android_OS2.3, YouTube_2_Android_OS5.2, Facebook . . . " indicating the native apps. In this example, the app connection data 218 may indicate various relationships between each native app and one or more associated connections as follows: "App 1: -->URL2, App1 includes Library 3, App2: -->URL4. . . " The connection determination module 116 may then assign indicators (e.g., IDs) to the determined connections, e.g., as follows: "URL2 APP_id='YouTube_1232323,' Library 3 Unknown, URL4 ===Unknown, Library 5===App_id='YouTube_1232323'. . . " The connection determination module 116 may optionally normalize the data described above. The connection determination module 116, or a component of the search system 100 (e.g., a record generation/update module) may then augment the corresponding app state records included in the search data store 112 to include the (e.g., normalized) data. For example, the app state records may be augmented to include various features derived from the determined connections, such as "a number of inbound links," "a number of outbound links," and "link quality" (e.g., as determined using one or more algorithms). As a specific example, an app state record (e.g., "App_state_record_1") specifying a state of (e.g., an entry in) the native app YouTube may be augmented to include the following data: "App_state_record _1 (Video ID=123 in YouTube): num_in_links=1, num_out_links=12. . . "

In the example of FIG. 5A, upon determining the one or more connections associated with the native app, the connection determination module 116 may be further configured to generate a quality value (e.g., a numeric value between 0 and 1) indicating a degree of quality associated with the app based on the connections. In general, a relatively larger quality value generated for a native app may indicate a relatively higher degree of quality associated with the app compared to a relatively smaller quality value generated for the app. For example, upon identifying N connections associated with the native app, where N is an integer value greater or equal to 1, the connection determination module 116 may generate a quality value for the app based on one or more (e.g., a subset) of the N connections. In some examples, the connection determination module 116 may generate the quality value for the native app based on a single one of the N connections. In other examples, the connection determination module 116 may generate the quality value for the native app based on multiple ones of the N connections. In this example, the quality value being closer to 0 than 1 (e.g., less than 0.5) may indicate a relatively lower quality of the native app (e.g., the associated one or more connections), whereas the quality value being closer to 1 than 0 (e.g., greater than 0.5) may indicate a relatively higher quality of the app (e.g., the connections). Upon generating the quality value for the native app based on the connections associated with the app, the connection determination module 116 may further assign the value to (e.g., associate the value with) all states of the app that are specified by app state records included in the search data store 112. As described herein, in some examples, the analysis system 108 and/or a component of the search system 100 may also store the quality value in each such app state record included in the search data store 112.

In some examples, to generate the quality value for the native app based on the one or more connections associated with the app, the connection determination module 116 may use a set of one or more rules. For example, the connection determination module 116 may apply the set of rules to an indication of the connections associated with the native app and compute the quality value for the app in response to applying the set of rules to the indication. In these examples, the set of rules may be manually generated based on user inputs and/or automatically generated based on data indicating past user behavior. For example, the set of rules may be defined by one or more human operators of the analysis system 108. In this example, each rule may be associated with one or more connections (e.g., with one or more specific resources linked to a native app by the connections) and configured to influence the quality value based on whether or not the connections are present with respect to a particular native app. For example, each rule may be configured to contribute positively or negatively to the quality value based on whether the connections are associated with the native app. In other examples, each rule may be configured to contribute positively or negatively to the quality value based on the number, the types, and/or the relative (e.g., individual) quality of the connections associated with the native app (e.g., based on the number of inbound and/or outbound links, or the popularity or common use of a particular connection). Additionally, or alternatively, the set of rules may be defined using data indicating past user behavior with respect to native apps having particular connections to other resources. For example, the set of rules may be defined using so-called "click data" indicating whether and/or how often users select search results 220 specifying states of native apps associated with specific connections. In general, the set of rules may be defined using any (e.g., historical) user behavioral data describing a degree of quality a user perceives to be associated with a particular connection associated with a given native app, a degree of quality the user perceives to be associated with the app itself, and/or whether and/or how often the user has previously selected a search result 220 that specifies a state of the app. In additional examples, the set of rules may be defined using data derived by correlating other indicators of quality of native apps (e.g., user ratings) with particular connections associated with the apps. For example, the data may indicate that one or more native apps each having one or more specific connections (e.g., links, or app libraries) frequently receive low user ratings indicative of low quality in a particular distribution platform (e.g., Google Play® by Google Inc.).

In other examples, to generate the quality value for the native app based on the one or more connections associated with the app, the connection determination module 116 may use a machine-learned model. For example, the connection determination module 116 may include one or more supervised learning models configured to receive an indication of one or more connections associated with a native app and generate a quality value indicating a degree of quality associated with the app using the indication. For example, the connection determination module 116 may provide the indication of the connections to the machine-learned model as one or more inputs. The machine-learned model may compute the quality value based on the indication and output the value to the connection determination module 116. In some examples, the machine-learned model included in the connection determination module 116 may be created using training data (e.g., indications of native apps and indications of connections associated with the apps), some or all of which may be labeled with human-curated quality values. In this manner, the training data may include one or more indications of one or more training connections associated with each of one or more training native apps, and one or more training quality values each indicating a degree of quality associated with one of the training apps. In general, the training data may be generated using any of the various types of user behavioral data described above with reference to the set of rules. In some examples, the set of rules and/or the machine-learned model described herein may be embodied in one or more software instructions and included in a quality value generation module 508, as depicted in FIG. 5B. In the example of FIG. 5B, the quality value generation module 508 may be a part of the connection determination module 116, another module included in the analysis system 108, or within another stand-alone system or device.

In some examples, the quality value associated with the native app may indicate popularity of the one or more resources linked with the app by the one or more connections used to generate the value. For example, the quality value may indicate whether and/or how many other native apps connect with the resources and/or whether the resources are used by many users. In other examples, the quality value may indicate quality of the resources (e.g., whether the resources are updated frequently and/or whether the resources generally have positive user reviews and/or relatively high user ratings). In still other examples, the quality value may indicate one or more other properties of the resources determined using data associated therewith. In this manner, the quality value may indicate a degree of quality associated with the native app that links with the resources via the connections. In other words, the various properties associated with the resources (e.g., popularity, quality, and so forth) may be imputed onto the native app by virtue of the app being connected with the resources via the connections.

Upon the connection determination module 116 generating the app connection data 218 for the native app, including an indication of the connections and/or the quality value associated with the app, the analysis system 108 transmits the data 218 to the search system 100. The search system 100 may use the app connection data 218 as described herein. In some examples, the search system 100 may store some or all of the app connection data 218 (e.g., the indication of the connections and/or quality value) in the corresponding app state record of the search data store 112. For example, as described with reference to FIGS. 4A-4B, the search system 100 may store the app connection data 218 in a designated field of the app state record.

FIGS. 6A-6C illustrate various types of connections that may be associated with a native app. FIG. 6A depicts a native app ("Native App 1") that is connected with any combination of 1) another native app (e.g., "Native App 2"), 2) an API associated with the other app (e.g., "Native App 2 API"), 3) an app library associated with the other app (e.g., "Native App 2 Library"), 4) a website associated with the other app (e.g., a web equivalent of the other app), and 5) another resource associated with the other app that is not explicitly listed. In the example of FIG. 6A, Native App 1 is connected with one or more resources each of which is either a native app, or is associated with a native app. FIG. 6B depicts an example in which a connection between a native app ("Native App 1") and another native app ("Native App 2") is inferred based on a connection between the app and any of 1) an API associated with the other app, 2) an app library associated with the other app, 3) a website associated with the other app, and 4) another resource associated with the other app that is not explicitly listed. FIG. 6C depicts a native app ("Native App 1") that is connected with any combination of 1) a website not associated with another native app, 2) an ad network, 3) a game server, 4) a statistics service (e.g., Google Analytics® by Google Inc.) and 5) another non-app resource not explicitly listed. In the example of FIG. 6C, Native App 1 is connected with one or more non-app resources.

FIG. 6D illustrates an example representation of connections associated with native apps. The representation shown in FIG. 6D may be referred to herein as an "app connection graph" and may be included as part of app connection data 218 generated by the analysis system 108. The app connection graph of FIG. 6D indicates one or more connections ("C1"... "C16") associated with each of one or more native apps ("Native App 1"... "Native App 3"). For example, the native apps may be referenced by one or more AAMs included in one or more app state records stored in the search data store 112. As shown in FIG. 6D, the connections are configured to link (e.g., facilitate data exchange between) each of the native apps and one or more other resources, such as another native app (e.g., another one of the apps), an API, an app library, and/or a non-app resource (e.g., a website, an ad network, or another resource). The analysis system 108 may generate the app connection graph of FIG. 6D by identifying the connections associated with the native apps using any of the static and dynamic connection analysis techniques described herein. In some examples (not shown), the analysis system 108 may further include indications of (e.g., app state IDs included in) app state records specifying states of the native apps within the app connection graph. Upon generating the app connection graph, the analysis system 108 may store the graph in a connection record included in the connection data store 118 for later retrieval. At a later point in time (e.g., in response to the search system 100 receiving a search query 210), the analysis system 108 may retrieve and traverse the app connection graph to determine the one or more connections associated with a particular one of the native apps 600. Traversing the app connection graph may enable the analysis system 108 to determine the connections associated with the native app 600 relatively quicker than by performing the static and/or dynamic connection analysis for the app 600.

FIGS. 7A-7C depict example GUIs that may be generated on one of the user device(s) 102 according to this disclosure. In particular, the examples of FIGS. 7A-7C depict the user device 102 performing a search for states of native apps using a search query 210 specified by a user of the device 102 and app connection data 218 associated with the apps. As shown in FIG. 7A, the user initially enters a search query "late night diners" 210 into a search field 212 of a GUI of a search app 204 executing on the user device 102. As also shown, the user then interacts with a search button 214 of the GUI to cause the search app 204 to transmit the search query 210 to the search system 100. As described herein, in some examples, the user device 102 (e.g., the search app 204) may also transmit app interaction data 216 to the search system 100 (e.g., with the search query 210, or separately). As also described herein, the user device 102 (e.g., the app interaction determination module 208) may generate the app interaction data 216 by monitoring interactions (e.g., data exchanges) between the native app(s) 206 included on the device 102 and other (e.g., native app and/or non-app) resources. The app interaction data 216 may indicate the interactions between the native app(s) 206 and the other resources.

The search system 100 may receive the search query 210 and, e.g., the app interaction data 216, from the user device 102. The search system 100 may then generate search results 220 that each specify a state of a native app based on the search query 210 and app connection data 218 generated by the analysis system 108, as described herein. In some examples, the analysis system 108 may generate the app connection data 218 using the app interaction data 216, as also described herein. In the example of FIGS. 7A-7C, the search results 220 specify states of native apps Yelp, "TRIPADVISOR®" by TripAdvisor LLC (hereinafter, "TripAdvisor"), and "OPENTABLE®" by OpenTable Inc. (hereinafter, "OpenTable"). In this example, Yelp and TripAdvisor are installed on the user device 102, whereas OpenTable is not installed on the device 102. Also in this example, the app connection data 218 used by the search system 100 to generate the search results 220 may indicate one or more connections associated with each of these native apps. Additionally, or alternatively, the app connection data 218 may indicate quality values each associated with one of the native apps, where each value is generated based at least in part on the connections associated with the corresponding native app. To generate the search results 220, the search system 100 may identify app state records included in the search data store 112 that specify states of Yelp, TripAdvisor, and OpenTable. In particular, the app state records may specify entries in Yelp for specific "IHOP," "Denny's," and "Taco Bell" restaurants and a main (e.g., home) page of each of TripAdvisor and OpenTable. As described herein, the search system 100 may identify the app state records based on the search query 210. In some examples, the search system 100 may further identify the app state records based on the app connection data 218 (e.g., the quality values), as also described herein. Additionally, or alternatively, the search system 100 may rank the identified app state records, e.g., based on the app connection data 218 (e.g., the indications of the connections and/or quality values), as further described herein. The search system 100 may select one or more AMs (e.g., one or more AAMs, WAMs, and/or ADAs) from the identified and, e.g., ranked, app state records and transmit the search results 220, including the AMs, to the user device 102.

As shown in FIG. 7B, the user device 102 receives the search results 220 from the search system 100 in response to transmitting the search query 210 and, e.g., the app interaction data 216, to the system 100. As also shown, the user device 102 displays the search results 220 to the user as user selectable links 700-1 . . . 700-6 (collectively, the "links 700"). For example, the user device 102 may generate each of the links 700 using link (e.g., text and/or image) data also received from the search system 100 as part of the search results 220. In this example, the search results 220 are responsive to the search query 210 (i.e., the text string "later night diners"). In particular, the search results 220 specify states of Yelp, TripAdvisor, and OpenTable, which are each associated with restaurants and related services. As further shown, the user device 102 may order the links 700 within a list. For example, the user device 102 may order each link 700 based on the result score associated (e.g., received) with the corresponding one of the search results 220. As also shown, the user device 102 may display the links 700 such that links associated with a particular native app (e.g., Yelp) are displayed together. For example, as shown in FIG. 7B, the links 700-2, 700-3, and 700-4 associated with Yelp are grouped together under the link or "header" 700-1 that indicates Yelp. In other examples, links associated with different native apps may be distributed in a different manner (e.g., mixed).

As also shown in FIG. 7B, the user may select (e.g., touch, or click on) one of the links 700 on the user device 102, namely the user selectable link 700-3 specifying a state of Yelp corresponding to an entry in Yelp for a particular Denny's restaurant located in San Jose, Calif. As shown in FIG. 7C, upon the user selecting the user selectable link 700-3, the user device 102 may launch Yelp and set Yelp into the state specified by the link 700-3 (e.g., using an AAM included in the link 700-3). Specifically, as depicted in FIG. 7C, the user device 102 may configure Yelp to display a GUI 704 corresponding to the entry in Yelp for the Denny's restaurant. Upon the user device 102 setting Yelp into the state, the user may interact with the state (e.g., read reviews for, get directions to, and/or call the Denny's restaurant).

As described herein, in other examples, upon the user selecting another one of the links 700 (e.g., a GUI element 702 of the link 700-6) on the user device 102, the device 102 may download and install the corresponding native app (e.g., OpenTable using an ADA included in the link 700-6). The user device 102 may then optionally launch the native app and set the app into a state of the app specified by the selected one of the links 700. Additionally, or alternatively, the user device 102 may launch the web browser app 202 included on the device 102 and access a web-equivalent of the state of the native app specified by the selected link 700 (e.g., access a state of a web-based app using a WAM included in the link 700-6).

Figure 8:
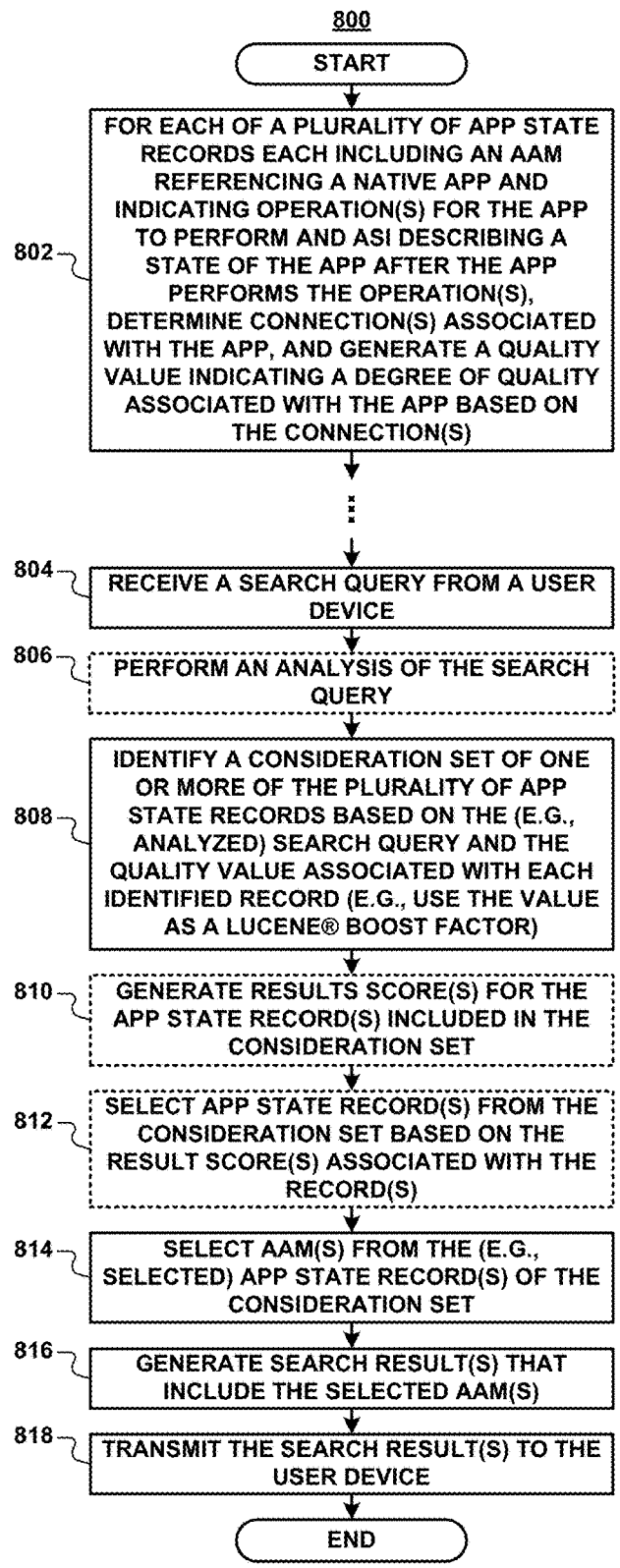

FIG. 8 is a flow diagram that illustrates an example method 800 for generating search results 220 based on a search query 210 and app connection data 218 using the search system 100. As shown in FIG. 8, in block 802, the analysis system 108 may initially, for each of a plurality of app state records included in the search data store 112 each including an AAM referencing a native app and indicating one or more operations for the app to perform and ASI describing a state of the app after the app performs the operations, determine one or more connections associated with the app and generate a quality value indicating a degree of quality associated with the app based on the connections. As described herein, to determine the connections associated with the native app, the analysis system 108 may perform any of static (e.g., analyze software instructions associated with the app) and dynamic (e.g., detect interactions between the app and other resources) connection analyses. As further described herein, to generate the quality value based on the connections, the analysis system 108 may use any of a set of rules and a machine-learned model. Upon determining the connections and generating the quality value for each of the plurality of app state records, the analysis system 108 may transmit app connection data 218, including the value and, e.g., an indication of the connections, to the search system 100. In some examples, the analysis system 108 may also store the app connection data 218 in a connection record included in the connection data store 118. In other examples, upon receiving the app connection data 218 from the analysis system 108, the search system 100 may store the data 218 in the corresponding one of the plurality of app state records included in the search data store 112.

In block 804, (e.g., at a later point in time following the analysis system 108 generating the app connection data 218, as described with reference to block 802), the search system 100 may receive a search query 210 specified by a user from one of the user device(s) 102 (e.g., as part of a query wrapper). In block 806, the search system 100 (e.g., the query analysis module 300) may optionally perform an analysis of the search query 210. For example, the search system 100 may perform any of tokenization, filtering, stemming, synonymization, and stop word removal with respect to the search query 210. In some examples, the search system 100 may receive additional information from the user device 102 (e.g., as part of the query wrapper, or separately), such as user information and/or geo-location, platform, and IP address information associated with the device 102.

In block 808, the search system 100 (e.g., the set generation module 302) may identify a consideration set of one or more of the plurality of app state records included in the search data store 112 based on the (e.g., analyzed) search query 210 and based on the quality value associated with each identified record, as indicated by the app connection data 218. For example, the search system 100 may identify each app state record of the consideration set based on (e.g., text) matches between terms of the search query 210 and terms of information (e.g., ASI and/or an app state ID) included in the record. In this example, the search system 100 may further identify each app state record based on the quality value associated with (e.g., included in) the record (e.g., by using the value as a boost factor in Lucene). Thus, the search system 100 may identify the app state records of the consideration set such that each record matches the search query 210 and specifies a state of a native app having a particular degree of quality.

In some examples, the search system 100 may identify at least one of the app state records of the consideration set in the manner described herein using a previously generated quality value associated with the record. For example, the analysis system 108 may generate the quality value prior to the search system 100 receiving the search query 210 from the user device 102. As one example, the analysis system 108 may store the quality value in a connection record included in the connection data store 118. As another example, the search system 100 may store the quality value in the one of the plurality of app state records included in the search data store 112 that corresponds to (e.g., that will be identified as) the app state record of the consideration set. In these examples, upon the search system 100 receiving the search query 210 from the user device 102, the system 100 may retrieve the quality value from any of these records and use the value as described herein to identify the corresponding app state record of the consideration set.

In other examples, the search system 100 may identify at least one of the app state records of the consideration set using a dynamically-generated quality value associated with the record. For example, the analysis system 108 may generate the quality value in response to the search system 100 receiving the search query 210 from the user device 102. In a specific example, to generate the quality value for the app state record, the analysis system 108 may analyze (e.g., traverse) an app connection graph (e.g., as shown in FIG. 6D), which the system 108 may have previously generated. In this example, the app connection graph may indicate the native app referenced by the AAM included in the app state record and one or more connections between the app and other resources (e.g., native apps referenced by AAMs included in other app state records of the search data store 112 and/or non-app resources). As a result of analyzing the app connection graph, the analysis system 108 may identify the connections associated with the native app and generate the quality value based on the connections. Upon the analysis system 108 generating the quality value for the app state record, the search system 100 may use the value as described herein to identify the record.

In blocks 810-812, the search system 100 (e.g., the set processing module 304) may optionally process the consideration set of app state records. Specifically, in block 810, the search system 100 may generate one or more result scores for the app state records included in the consideration set (e.g., generate a result score for each app state record of the consideration set). In block 812, the search system 100 may select one or more app state records from (e.g., select a subset of) the consideration set based on the one or more result scores associated with the selected records. For example, the search system 100 may select one or more app state records of the consideration set having the highest (e.g., largest) one or more result scores.

In block 814, the search system 100 (e.g., the result generation module 114) may select one or more AAMs from the (e.g., selected) app state records of the consideration set. For example, the search system 100 may select an AAM from each (e.g., selected) app state record of the consideration set. In some examples, the search system 100 may also select other information from the (e.g., selected) app state records of the consideration set, such as link data, result scores, and/or other data (e.g., ADAs and/or WAMs). In block 816, the search system 100 (e.g., the result generation module 114) may generate one or more search results 220 that include the selected AAMs. For example, the search system 100 may generate the search results 220 such that each result 220 includes one of the AAMs and, e.g., the other information, selected from each (e.g., selected) app state record. In block 818, the search system 100 (e.g., the result generation module 114) may transmit the search results 220, including the selected AAMs and, e.g., the selected other information, to the user device 102.

Figure 9:
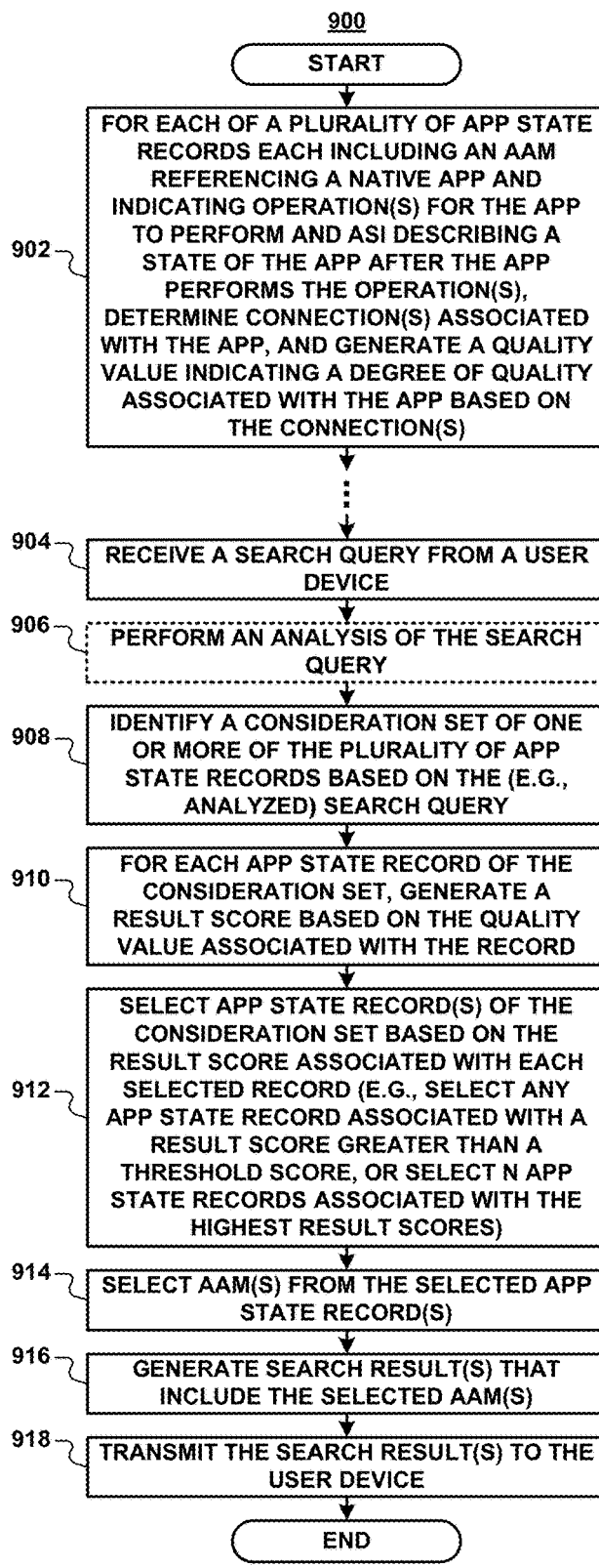

FIG. 9 is a flow diagram that illustrates another example method 900 for generating search results 220 based on a search query 210 and app connection data 218 using the search system 100. Blocks 902-906 of the method 900 are analogous to blocks 802-806 of the method 800. In block 908, the search system 100 (e.g., the set generation module 302) may identify a consideration set of one or more of the plurality of app state records included in the search data store 112 based on the (e.g., analyzed) search query 210. For example, the search system 100 may identify each app state record of the consideration set based on (e.g., text) matches between terms of the search query 210 and terms of information (e.g., ASI and/or an app state ID) included in the record, in a similar manner as described with reference to the method 800.

In block 910, the search system 100 (e.g., the set processing module 304) may, for each app state record of the consideration set, generate a result score based on the quality value associated with the record. As described herein, to generate the result score based on the quality value, the search system 100 may use the value as a scoring feature (e.g., along with one or more other scoring features associated with the search query 210, the app state record, and/or other parameters) in conjunction with an MLR model. As also described herein, in other examples, to generate the result score, the search system 100 may use the connections as one or more scoring features (e.g., along with one or more other scoring features) in conjunction with the MLR model. In some examples, the search system 100 may generate the result score for at least one of the app state records of the consideration set using a quality value that has been previously generated, in a similar manner as described with reference to the method 800. Alternatively, the search system 100 may generate the result score using a dynamically-generated app quality value, also in a similar manner as described with reference to the method 800.

In block 912, the search system 100 (e.g., the set processing module 304) may select one or more app state records (e.g., a subset) of the consideration set based on the result score associated with each selected record. For example, the search system 100 may select any app state record of the consideration set that is associated with a result score that is greater than a predetermined threshold score. Alternatively, the search system 100 may select N app state records of the consideration set (e.g., where N is an integer value that is greater than 0) that are associated with the highest (e.g., largest) one or more results scores. In a specific example, the search system 100 may rank the app state records of the consideration set based on the result scores associated with the records. For example, the search system 100 may arrange the app state records in an order of decreasing result scores. The search system 100 may then select one or more of the arranged app state records based on the order. For instance, the search system 100 may select one or more of the app state records that are associated with result scores that are greater than a predetermined threshold score, or with the highest (e.g., largest) results scores.

In block 914, the search system 100 (e.g., the result generation module 114) may select one or more AAMs from the selected app state records. For example, the search system 100 may select an AAM from each selected app state record. In some examples, the search system 100 may also select other information from the selected app state records, such as link data, result scores, and/or other data (e.g., ADAs and/or WAMs). In block 916, the search system 100 (e.g., the result generation module 114) may generate one or more search results 220 that include the selected AAMs. For example, the search system 100 may generate the search results 220 such that each result 220 includes one of the AAMs and, e.g., the other information, selected from each selected app state record. In block 918, the search system 100 (e.g., the result generation module 114) may transmit the search results 220, including the selected AAMs and, e.g., the selected other information, to the user device 102.

In some examples, the transmission of the search results 220 from the search system 100 to the user device 102, as described in the methods 800 and 900, may be intermediated by any number of other services, systems, and/or devices.

FIGS. 10A-10B are flow diagrams that each illustrate an example of a particular aspect of the methods 800 and 900 described herein relating to generating app connection data 218. Specifically, FIG. 10A depicts an example method 1000A for generating a quality value indicating a degree of quality associated with a native app based on one or more connections associated with the app using a set of rules. FIG. 10B, in turn, depicts an example method 1000B for generating the quality value based on the connections using a machine-learned model.

As shown in FIG. 10A, in block 1002A, the analysis system 108 may initially generate a set of one or more rules (e.g., software instructions and associated parameters) configured to compute a quality value indicating a degree of quality associated with a native app based on one or more connections associated with the app. For example, a human user may specify the set of rules and transmit an indication of the set to the analysis system 108. Additionally, or alternatively, the analysis system 108 may automatically define the set of rules using various considerations. In some examples, the analysis system 108 may generate the set of rules using data indicating a degree of quality users perceive to be associated with specific connections. In other examples, the analysis system 108 may generate the set of rules using data indicating a degree of quality users perceive to be associated with native apps having particular connections. In still other examples, the analysis system 108 may generate the set of rules using data indicating whether and/or how often users select search results specifying states of native apps associated with particular connections. As one example, the set of rules may specify that the presence of one or more particular connections associated with the native app results in the quality value being increased or decreased by a predetermined amount (e.g., 0.1). As another example, the set of rules may indicate that the absence of one or more specific connections associated with the native app results in the quality value being increased or decreased by a predetermined amount. As still another example, the set of rules may dictate that the presence and/or absence of one or more specific combinations of connections associated with the native app results in the quality value being increased or decreased by a predetermined amount.

As described with reference to the methods 800 (e.g., block 802) and 900 (e.g., block 902), the analysis system 108 may determine one or more connections associated with a native app and generate a quality value indicating a degree of quality associated with the app based on the connections. To generate the quality value, as shown in block 1004A, the analysis system 108 may apply the set of rules described above to the connections. As shown in block 1006A, in response to applying the set of rules to the connections, the analysis system 108 may compute the quality value. For example, the analysis system 108 (e.g., one or more processing units included therein) may execute software instructions (e.g., stored in a memory) that embody the set of rules, causing the system 108 to receive an indication of the connections as one or more inputs, process the connections, generate the quality value, and transmit the value as an output.

As shown in FIG. 10B, in block 1002B, the analysis system 108 may initially generate training data that includes an indication of one or more training connections associated with each of one or more training native apps and one or more training quality values each indicating a degree of quality associated with one of the apps. For example, in a similar manner as described with reference to FIG. 10A, one or more human users may specify the training data and transmit the data to the analysis system 108. Additionally, or alternatively, the analysis system 108 may automatically generate the training data using any of various considerations, e.g., those described with reference to FIG. 10A. In a specific example, the analysis system 108 may generate the training data by providing the indication of the training connections associated with the training native apps to one or more human users, and, in response to providing the indication, receiving the training quality values from the users. In block 1004B, the analysis system 108 may generate a machine-learned model (e.g., software instructions and associated parameters) based on the training data. In other words, the analysis system 108 may train the machine-learned model using the training data configuring the model to compute a quality value indicating a degree of quality associated with a native app based on one or more connections associated with the app.

As described herein with reference to the methods 800 (e.g., block 802) and 900 (e.g., block 902), the analysis system 108 may determine one or more connections associated with a native app and generate a quality value indicating a degree of quality associated with the app based on the connections. To generate the quality value, as shown in block 1006B, the analysis system 108 may provide an indication of the connections to the machine-learned model described above as one or more inputs. As shown in block 1008B, in response to providing the indication of the connections to the machine-learned model, the analysis system 108 may receive the quality value from the model. For instance, the analysis system 108 (e.g., one or more processing units included therein) may execute software instructions (e.g., stored in a memory) that embody the machine-learned model, causing the system 108 to receive the indication of the connections as the inputs, process the connections, generate the quality value, and transmit the value as an output.

Figure 11:
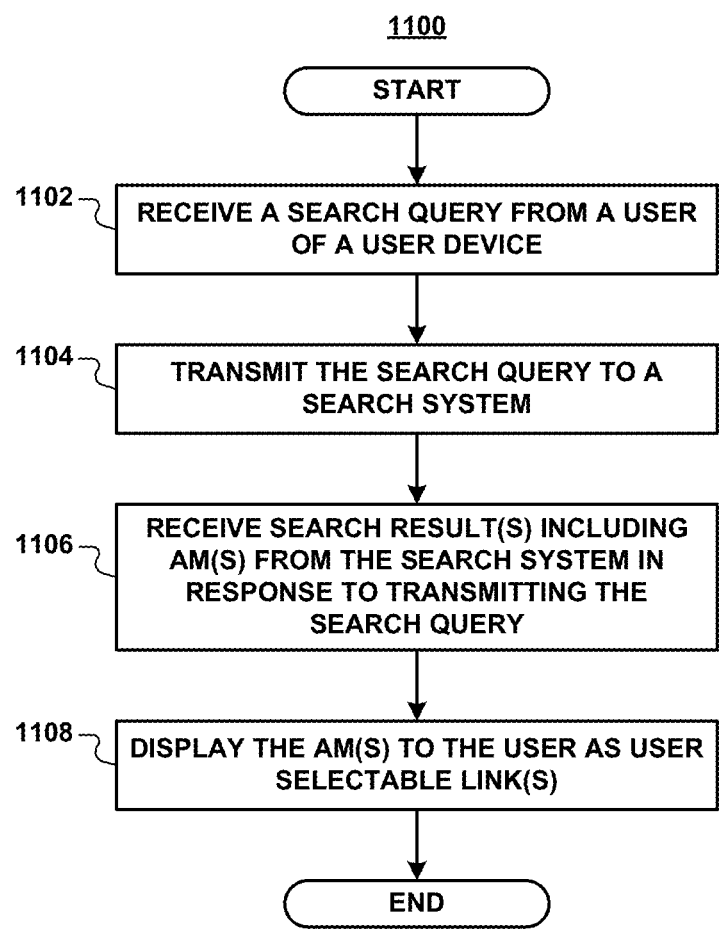
FIGS. 11-12 are flow diagrams that illustrate example methods for generating search results based on a search query and app connection data using a user device.

FIG. 11 is a flow diagram that illustrates an example method 1100 for generating search results 220 based on a search query 210 and app connection data 218 using a user device 102. As shown in FIG. 11, in block 1102, one of the user device(s) 102 may initially receive a search query 210 from a user of the device 102. As described herein, the user device 102 may receive the search query 210 from the user via a search app 204 executing on the device 102. In block 1104, the user device 102 may transmit the search query 210 to the search system 100. As also described herein, the user device 102 may transmit the search query 210 to the search system 100 in response to receiving an input from the user via the search app 204. In this example, the search system 100 may receive the search query 210 from the user device 102 and generate one or more search results 220 based on the query 210 and app connection data 218 generated by the analysis system 108. As explained herein, the search results 220 may include one or more AMs (e.g., AAM(s), WAM(s), and/or ADA(s)), link data, result scores, and/or other data. The search system 100 may then transmit the search results 220 to the user device 102.

In block 1106, the user device 102 may receive the search results 220, including the AMs, from the search system 100 in response to transmitting the search query 210 to the system 100. In block 1108, the user device 102 may display the AMs to the user as one or more user selectable links. As described herein, the user device 102 may display the AMs as the user selectable links via the search app 204. For example, the user device 102 may generate each user selectable link to include one or more of the AMs and, e.g., the corresponding link data and/or other information also received as part of the search results 220. In some examples, the user device 102 may further rank (e.g., arrange within an order) the user selectable links including the AMs based on the corresponding result scores also received along with the search results 220.

Figure 12:
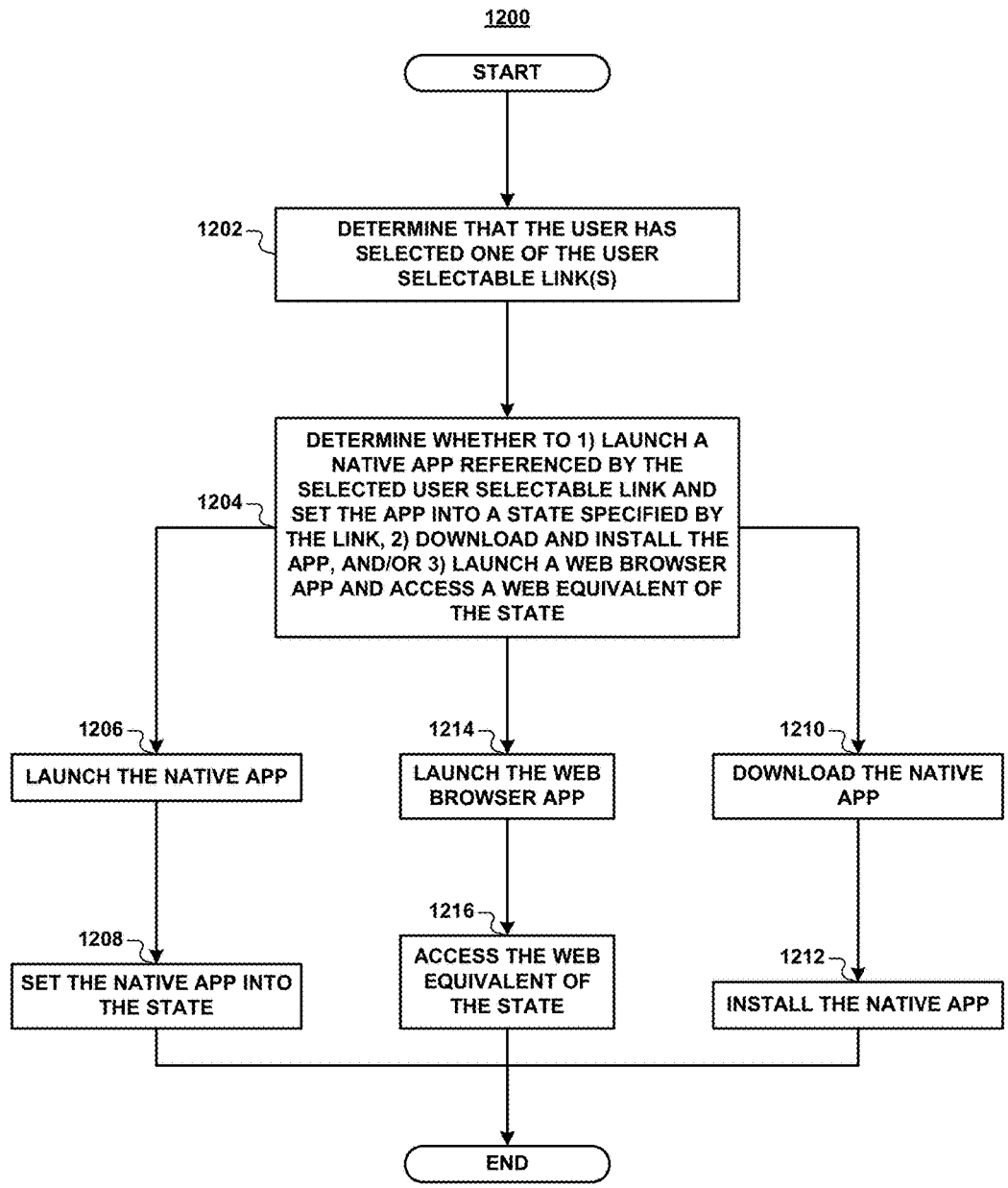

FIG. 12 is a flow diagram that illustrates an example method 1200 for performing one or more actions in response to a user of a user device 102 interacting with search results 220 displayed to the user on the device 102. As shown in FIG. 12, in block 1202, the user device 102 may initially determine (e.g., detect) that the user has selected one of the user selectable links displayed to the user as described with reference to FIG. 11. As also shown, in block 1204, in response to detecting the user selection, the user device 102 may determine whether to perform any combination of the following actions. As one example, the user device 102 may launch a native app referenced by the selected user selectable link (e.g., by an AAM included in the link), as shown in block 1206, and set the app into a state specified by the link (e.g., by the AAM), as shown in block 1208. As another example, the user device 102 may download and install the native app (e.g., from a digital distribution platform using an ADA included in the link), as shown in blocks 1210 and 1212, respectively. In this example, upon downloading and installing the native app, the user device 102 may launch the app and set the app into the state (e.g., using an AAM also included in the link), in a similar manner as described above. As still another example, the user device 102 may launch a web browser app 202 included on the device 102, as shown in block 1214, and access a web equivalent of the state using the app 202 (e.g., using a WAM included in the link), as shown in block 1216.

In additional examples, the analysis system 108 may generate different quality values for app state records that specify states of the same native app. For example, the analysis system 108 may initially determine one or more connections associated with the native app, in a similar manner as previously described. The analysis system 108 may further determine whether any of the identified connections are associated with particular states of the native app, e.g., that are each specified by an app state record included in the search data store 112. As described herein, each state of the native app may be associated with one or more specific functions provided by the app. For example, the analysis system 108 may, for a particular one of the identified connections, determine that the native app uses the data exchanged between the app and another resource via the connection as part of a specific state of (e.g., to perform a particular function provided by) the app specified by an app state record included in the search data store 112. The analysis system 108 may make a similar determination with respect to one or more other connections. The analysis system 108 may then generate a quality value for the app state record that specifies the state of the native app based at least in part on one or more such connections that are each associated with the state. In this example, the quality value may indicate a degree of quality associated with the state of the native app, and not necessarily with the app itself. Stated another way, the various properties associated with the resources connected with the state of the native app by these connections may be imputed onto the state, rather than the app as a whole, by virtue of the state in particular being connected with the resources via the connections. In these examples, the app connection data 218 generated for a given app state record included in the search data store 112 may indicate one or more connections that are associated with the state of the native app specified by the record in particular and/or a quality value that is generated specifically for the record, as described herein. The search system 100 may identify and/or rank one or more of the app state records included in the search data store 112 using the indication of the connections and/or the quality value associated with each record, in a similar manner as described herein. Also in these examples, an app connection graph, as described with reference to FIG. 6D, or a similar data structure, may represent one or more connections between a specific state of (e.g., a particular function provided by) a native app and one or more other resources.

In further examples, the analysis system 108 may generate other (e.g., textual) features for app state records that specify states of a native app based on one or more connections associated with the app. In these examples, the features may also differ among the app state records, e.g., depending on which of the connections are associated with each of the states. As one example, the analysis system 108 may initially determine the connections associated with the native app, as previously described. The analysis system 108 may further determine whether any of the connections are associated with particular states of the native app, as also previously described. The analysis system 108 may then, for each of one or more app state records included in the search data store 112 that specify such states, determine one or more terms (e.g., keywords) associated with one or more resources connected with the corresponding state by those of the connections that are associated with the state. In these examples, the app connection data 218 generated for a particular one of these app state records may indicate the one or more connections associated with the state of the native app specified by the record and/or the terms determined for the record. The search system 100 may identify and/or rank each of these app state records using the indication of the connections and/or the terms determined for the record.

In further examples, the search system 100 may generate one or more additional search results (not shown) that include content that does not specify states of native apps (e.g., content related to native apps, websites, documents, and/or media files). In these examples, the search system 100 may identify one or more records (e.g., app records, or other data structures) stored in a data store that include the content based on the search query 210, in a similar manner as described herein. The search system 100 may then select the content from the identified records and transmit the content to the user device 102 with the search results 220.

The modules and data stores included in the search system 100 and analysis system 108 represent features that may be included in these systems 100, 108 as they are described in the present disclosure. For example, the search module 110, search data store 112, and result generation module 114 may represent features included in the search system 100. Similarly, the connection determination module 116, connection data store 118, and connection record module 120 may represent features included in the analysis system 108. The modules and data stores described herein may be embodied by electronic hardware, software, and/or firmware. Depiction of different features as separate modules and data stores does not necessarily imply whether the modules and data stores are embodied by common or separate electronic hardware, software, and/or firmware components. In some implementations, the features associated with the modules and data stores depicted herein may be realized by one or more common or separate electronic hardware, software, and/or firmware components.

The modules and data stores may be embodied by electronic hardware, software, and/or firmware components including, but not limited to, one or more processing units, memory components, input/output (I/O) components, and interconnect components. The interconnect components may be configured to provide communication between the processing units, memory components, and I/O components. For example, the interconnect components may include one or more buses configured to transfer data between electronic components. The interconnect components may also include control circuits (e.g., a memory controller and/or an I/O controller) configured to control communication between electronic components.

The processing units may include one or more central processing units (CPUs), graphics processing units (GPUs), digital signal processing units (DSPs), or other processing units. The processing units may be configured to communicate with the memory components and I/O components. For example, the processing units may be configured to communicate with the memory components and I/O components via the interconnect components.

A memory component (memory) may include any volatile or non-volatile media. For example, the memory may include electrical media, magnetic media, and/or optical media, such as a random access memory (RAM), read-only memory (ROM), non-volatile RAM (NVRAM), electrically-erasable programmable ROM (EEPROM), Flash memory, hard disk drives (HDD), magnetic tape drives, optical storage technology (e.g., compact disc, digital versatile disc, and/or Blu-ray disc), or other memory components. The memory components may include (e.g., store) the data described herein. For example, the memory components may store the data included in the app state records 400A of the search data store 112 and/or the data included in (e.g., connection records of) the connection data store 118. The memory components may also include instructions executed by the processing units. For example, the memory components may include computer-readable instructions that, when executed by the processing units, cause the units to perform the various functions attributed to the modules and data stores described herein.

The I/O components may refer to electronic hardware, software, and/or firmware that provide communication with a variety of different devices. For example, the I/O components may provide communication between other devices and the processing units and memory components. In some examples, the I/O components may be configured to communicate with a computer network. For example, the I/O components may be configured to exchange data over a computer network using a variety of different physical connections, wireless connections, and protocols. The I/O components may include network interface components (e.g., a network interface controller), repeaters, network bridges, network switches, routers, and firewalls. In some examples, the I/O components may include hardware, software, and/or firmware configured to communicate with various human interface devices, including display screens, keyboards, pointer devices (e.g., a mouse), touchscreens, speakers, and microphones. In other examples, the I/O components may include hardware, software, and/or firmware configured to communicate with additional devices, such as external memory (e.g., external HDDs).

In some examples, the search system 100 and/or analysis system 108 may be a system of one or more computing devices (e.g., a computer search system) configured to implement the techniques described herein. Put another way, the features attributed to the modules and data stores described herein may be implemented by one or more computing devices. Each computing device may include any combination of electronic hardware, software, and/or firmware described herein. For example, each computing device may include any combination of the one or more processing units, memory components, I/O components, and interconnect components described herein. The computing devices may also include various human interface devices, including display screens, keyboards, pointing devices (e.g., a mouse), touchscreens, speakers, and microphones. The computing devices may also be configured to communicate with additional devices, such as external memory (e.g., external HDDs).

The computing devices of the search system 100 and/or analysis system 108 may be configured to communicate with the network 106. The computing devices may also be configured to communicate with one another via a computer network. In some examples, the computing devices may include one or more server computing devices configured to communicate with the user device(s) 102 (e.g., receive search queries 210 and app interaction data 216, and transmit search results 220), gather data from the data source(s) 104, index the data, store the data, and store other documents. In other examples, the computing devices may reside within a single machine at a single geographic location, within multiple machines at a single geographic location, or be distributed across a number of geographic locations.

Additionally, the various implementations of the search system 100 and analysis system 108 described herein (e.g., using one or more computing devices that include one or more processing units, memory components, I/O components, and interconnect components) are equally applicable to any of the user device(s) 102, as well as to the various components thereof.

What is claimed is:

1. A method comprising:
    for each of a plurality of application (app) state records each including an app access mechanism (AAM) and app state information (ASI), wherein the AAM references a native app and indicates one or more operations for the app to perform, and wherein the ASI describes a state of the app after the app has performed the one or more operations, determining, by one or more processors of an electronic device, one or more connections associated with the app, and generating, by the one or more processors of the electronic device, a quality value indicating a degree of quality associated with the app based on the one or more connections;
    receiving, by the one or more processors of the electronic device, a search query from a user device;
    identifying, by the one or more processors of the electronic device, one or more of the plurality of app state records based on the search query and based on the quality value associated with each identified record;
    selecting, by the one or more processors of the electronic device, the one or more AAMs from the identified one or more of the plurality of app state records; and
    transmitting, by the one or more processors of the electronic device, the one or more AAMs to the user device.

2. The method of claim 1, wherein the one or more connections associated with the native app referenced by the AAM included in at least one of the plurality of app state records comprise one or more of the following:
    an outbound link configured to enable the native app to access another resource; and
    an inbound link configured to enable another resource to access the native app.

3. The method of claim 1, wherein the one or more connections associated with the native app referenced by the AAM included in at least one of the plurality of app state records comprise one or more of the following:
    a link between the native app and another native app;
    a link between the native app and a native app programming interface (API);
    a native app library included in the native app; and
    a link between the native app and a web resource.

4. The method of claim 1, wherein determining the one or more connections associated with the native app referenced by the AAM included in at least one of the plurality of app state records comprises performing, by the one or more processors of the electronic device, a static connection analysis including identifying one or more software instructions associated with the app that cause the app to communicate with another resource.

5. The method of claim 1, wherein determining the one or more connections associated with the native app referenced by the AAM included in at least one of the plurality of app state records comprises performing, by the one or more processors of the electronic device, a dynamic connection analysis including detecting that the app is communicating with another resource.

6. The method of claim 1, wherein generating the quality value based on the one or more connections associated with the native app referenced by the AAM included in at least one of the plurality of app state records comprises:
    generating, by the one or more processors of the electronic device, a set of one or more rules including one or more software instructions configured to compute the quality value based on the one or more connections;
    applying, by the one or more processors of the electronic device, the set of one or more rules to the one or more connections; and
    in response to applying the set of one or more rules, computing, by the one or more processors of the electronic device, the quality value.

7. The method of claim 6, wherein generating the set of one or more rules comprises:
    receiving, by the one or more processors of the electronic device, an indication of one or more of a degree of quality a user perceives to be associated with a connection associated with a native app, a degree of quality the user perceives to be associated with the app, whether the user has selected a search result specifying the app, and how often the user has selected a search result specifying the app; and
    generating, by the one or more processors of the electronic device, the set of one or more rules based on the received indication.

8. The method of claim 1, wherein generating the quality value based on the one or more connections associated with the native app referenced by the AAM included in at least one of the plurality of app state records comprises:
    generating, by the one or more processors of the electronic device, training data including an indication of one or more training connections associated with each of one or more training native apps and one or more training quality values each indicating a degree of quality associated with one of the one or more training native apps;
    generating, by the one or more processors of the electronic device, a machine-learned model based on the training data, wherein the machine-learned model includes one or more software instructions configured to compute the quality value based on the one or more connections;
    providing, by the one or more processors of the electronic device, an indication of the one or more connections to the machine-learned model as one or more inputs; and
    in response to providing the indication, receiving, by the one or more processors of the electronic device, the quality value from the machine-learned model.

9. The method of claim 8, wherein generating the training data comprises:
    receiving, by the one or more processors of the electronic device, an indication of one or more of a degree of quality a user perceives to be associated with a connection associated with a native app, a degree of quality the user perceives to be associated with the app, whether the user has selected a search result specifying the app, and how often the user has selected a search result specifying the app; and generating, by the one or more processors of the electronic device, the training data based on the received indication.

10. The method of claim 1, wherein identifying at least one of the one or more of the plurality of app state records based on the quality value associated with the record comprises using the quality value as a boost factor within Lucene® information retrieval software developed by the Apache Software Foundation.

11. The method of claim 1, wherein identifying at least one of the one or more of the plurality of app state records based on the quality value associated with the record comprises determining, by the one or more processors of the electronic device, that the quality value is greater than a threshold value.

12. The method of claim 1, wherein identifying the one or more of the plurality of app state records based on the search query comprises identifying, by the one or more processors of the electronic device, each record based on one or more matches between one or more terms of the search query and one or more terms of the ASI included in the record.

13. A method comprising:
for each of a plurality of application (app) state records each including an app access mechanism (AAM) and app state information (ASI), wherein the AAM references a native app and indicates one or more operations for the app to perform, and wherein the ASI describes a state of the app after the app has performed the one or more operations, determining, by one or more processors of an electronic device, one or more connections associated with the app, and generating, by the one or more processors of the electronic device, a quality value indicating a degree of quality associated with the app based on the one or more connections;
receiving, by the one or more processors of the electronic device, a search query from a user device;
identifying, by the one or more processors of the electronic device, one or more of the plurality of app state records based on the search query;
for each of the identified one or more of the plurality of app state records, generating, by the one or more processors of the electronic device, a result score based on the quality value associated with the record;
selecting, by the one or more processors of the electronic device, one or more app state records from the identified one or more of the plurality of app state records based on the result score associated with each selected record;
selecting, by the one or more processors of the electronic device, the one or more AAMs from the selected one or more app state records; and
transmitting, by the one or more processors of the electronic device, the one or more AAMs to the user device.

14. The method of claim 13, wherein the one or more connections associated with the native app referenced by the AAM included in at least one of the plurality of app state records comprise one or more of the following:
an outbound link configured to enable the native app to access another resource;
an inbound link configured to enable another resource to access the native app;
a link between the native app and another native app;

a link between the native app and a native app programming interface (API);
a native app library included in the native app; and
a link between the native app and a web resource.

15. The method of claim 13, wherein determining the one or more connections associated with the native app referenced by the AAM included in at least one of the plurality of app state records comprises performing, by the one or more processors of the electronic device, one or more of a static connection analysis including identifying one or more software instructions associated with the app that cause the app to communicate with another resource, and a dynamic connection analysis including detecting that the app is communicating with another resource.

16. The method of claim 13, wherein generating the quality value based on the one or more connections associated with the native app referenced by the AAM included in at least one of the plurality of app state records comprises performing one or more of the following:
generating, by the one or more processors of the electronic device, a set of one or more rules including one or more software instructions configured to compute the quality value based on the one or more connections, applying the set of one or more rules to the one or more connections, and, in response to applying the set of one or more rules, computing the quality value; and
generating, by the one or more processors of the electronic device, training data including an indication of one or more training connections associated with each of one or more training native apps and one or more training quality values each indicating a degree of quality associated with one of the one or more training native apps, generating a machine-learned model based on the training data, wherein the machine-learned model includes one or more software instructions configured to compute the quality value based on the one or more connections, providing an indication of the one or more connections to the machine-learned model as one or more inputs, and, in response to providing the indication, receiving the quality value from the machine-learned model.

17. The method of claim 13, wherein generating the result score for at least one of the identified one or more of the plurality of app state records based on the quality value associated with the record comprises:
generating, by the one or more processors of the electronic device, training data including, for each of one or more training native apps, a training quality value and a training result score each associated with the training native app;
generating, by the one or more processors of the electronic device, a machine-learned relevance (MLR) model based on the training data, wherein the MLR model includes one or more software instructions configured to compute the result score based on the quality value;
providing, by the one or more processors of the electronic device, the quality value to the MLR model as an input; and
in response to providing the quality value, receiving, by the one or more processers of the electronic device, the result score from the MLR model.

18. The method of claim 13, wherein identifying the one or more of the plurality of app state records based on the search query comprises identifying, by the one or more processors of the electronic device, each record based on one or more matches between one or more terms of the search query and one or more terms of the ASI included in the record.

19. A system comprising one or more computing devices configured to:
- for each of a plurality of application (app) state records each including an app access mechanism (AAM) and app state information (ASI), wherein the AAM references a native app and indicates one or more operations for the app to perform, and wherein the ASI describes a state of the app after the app has performed the one or more operations, determine one or more connections associated with the app, and generate a quality value indicating a degree of quality associated with the app based on the one or more connections;
- receive a search query from a user device;
- identify one or more of the plurality of app state records based on the search query and based on the quality value associated with each identified record;
- select the one or more AAMs from the identified one or more of the plurality of app state records; and
- transmit the one or more AAMs to the user device.

20. A system comprising one or more computing devices configured to:
- for each of a plurality of application (app) state records each including an app access mechanism (AAM) and app state information (ASI), wherein the AAM references a native app and indicates one or more operations for the app to perform, and wherein the ASI describes a state of the app after the app has performed the one or more operations, determine one or more connections associated with the app, and generate a quality value indicating a degree of quality associated with the app based on the one or more connections;
- receive a search query from a user device;
- identify one or more of the plurality of app state records based on the search query;
- for each of the identified one or more of the plurality of app state records, generate a result score based on the quality value associated with the record;
- select one or more app state records from the identified one or more of the plurality of app state records based on the result score associated with each selected record;
- select the one or more AAMs from the selected one or more app state records; and
- transmit the one or more AAMs to the user device.

* * * * *